United States Patent
Sakai

(10) Patent No.: US 8,035,827 B2
(45) Date of Patent: Oct. 11, 2011

(54) APPLICATION MANAGEMENT SYSTEM, APPLICATION MANAGEMENT METHOD, PROGRAM, AND STORAGE MEDIUM

(75) Inventor: Katsuya Sakai, Akiruno (JP)

(73) Assignee: Canon Kabushiki Kaisha, Tokyo (JP)

( * ) Notice: Subject to any disclaimer, the term of this patent is extended or adjusted under 35 U.S.C. 154(b) by 1475 days.

(21) Appl. No.: 11/426,662

(22) Filed: Jun. 27, 2006

(65) Prior Publication Data

US 2006/0294492 A1  Dec. 28, 2006

(30) Foreign Application Priority Data

Jun. 28, 2005 (JP) ................................. 2005-188316
Mar. 24, 2006 (JP) ................................. 2006-083871

(51) Int. Cl.
*G06F 3/12* (2006.01)
(52) U.S. Cl. .......... 358/1.13; 358/1.14; 399/81; 399/82; 399/85; 715/760
(58) Field of Classification Search ........ 358/1.13–1.18; 399/81, 82, 85; 715/760
See application file for complete search history.

(56) References Cited

U.S. PATENT DOCUMENTS

| | | | |
|---|---|---|---|
| 6,065,074 A | 5/2000 | Minamizawa | |
| 6,947,949 B2 | 9/2005 | Fujisawa | |
| 7,058,332 B2 * | 6/2006 | Moroi | 399/80 |
| 2004/0139385 A1 * | 7/2004 | Sakaue | 715/500 |
| 2006/0041563 A1 | 2/2006 | Fujisawa | |

FOREIGN PATENT DOCUMENTS

| | | |
|---|---|---|
| EP | 1640862 A1 | 3/2006 |
| JP | 10-063511 A | 3/1998 |
| JP | 10-333926 A | 12/1998 |
| JP | 2000-293608 A | 10/2000 |
| JP | 2002-049492 A | 2/2002 |
| JP | 2002-229797 A | 8/2002 |
| JP | 2002-287990 A | 10/2002 |
| JP | 2002-333983 A | 11/2002 |
| JP | 2004-030601 A | 1/2004 |
| JP | 2004-127280 A | 4/2004 |
| WO | 2004-111848 A1 | 12/2004 |

* cited by examiner

*Primary Examiner* — Chan S Park
(74) *Attorney, Agent, or Firm* — Canon USA, Inc., I.P. Division

(57) ABSTRACT

In an application management system for managing a plurality of applications that are installed in an image processing device, in the case where an instruction of execution start is received, if an application execution unit has already executed an incompatible application that would cause an unintended operation of the application whose execution is to be started if concurrently executed with another application, and a warning screen about the application execution start is output.

9 Claims, 19 Drawing Sheets

FIG. 16A

AppId: abc12345
AppName: HISTORY MANAGEMENT
Version: 1.1.0
Vendor: ABCDEF Inc.
Require: LogManagement — 1601
Compatible: LogManagement — 1602

FIG. 16B

AppId: abc00001
AppName: COPY
Version: 1.0.0
Vendor: ABCDEF Inc.
Compatible: LogManagement — 1602

FIG. 16C

AppId: abc00010
AppName: SIMPLE SEND
Version: 3.1.0
Vendor: ABCDEF Inc.

FIG. 19A

AppId: abc12345
AppName: HISTORY MANAGEMENT
Version: 1.1.0
Vendor: ABCDEF Inc.
Require: LogManagement ; Device=XYZ — 1902
Compatible: LogManagement

AppId: abc00001
AppName: COPY
Version: 1.0.0
Vendor: ABCDEF Inc.
Compatible: LogManagement — 1902

FIG. 19C

AppId: abc00010
AppName: SIMPLE SEND
Version: 3.1.0
Vendor: ABCDEF Inc.

APPLICATION MANAGEMENT SYSTEM, APPLICATION MANAGEMENT METHOD, PROGRAM, AND STORAGE MEDIUM

BACKGROUND OF THE INVENTION

1. Field of the Invention

The present invention relates to an application management technology installed into an image processing device such as a copying machine.

2. Description of the Related Art

Up to now, copying machines have been proposed where additional applications are installed in the copying machines after product delivery and the installed applications are started, stopped, or uninstalled. For example, in a copying machine proposed in Japanese Patent Laid-Open No. 2002-287990, applications on the copying machine can be managed through a web browser on a PC. With such a copying machine, various applications can be developed and added in at a later time. It is therefore possible to incorporate the copying machine in an existing system, or to adopt the copying machine to a new system in a flexible manner.

In addition, a technology for restricting concurrent execution of applications in view of resources that the applications use, or in view of a dependency relation of the applications, or the like has been proposed. For example, Japanese Patent Laid-Open No. 10-333926 proposes a method of setting identification information for other applications whose program concurrent execution should be restricted and setting restriction conditions for each application. Then, during the execution of one selected application, the execution of set other applications is restricted under the restriction conditions until the one selected application execution is finished. Alternatively, depending on the execution status of the application, the execution of an application that is not desired to be concurrently executed on a UI is restricted.

However, when the concurrent execution of applications is restricted in the above-mentioned copying machine, the following problem occurs. According to a technology disclosed in Japanese Patent Laid-Open No. 10-333926,it is necessary to previously set restrict conditions for each application, and therefore those conditions need to be reset each time an applications that is not desired to be concurrently executed is newly released. For this reason, there is a problem in that the setting operation is a burden for users, thereby causing inconvenience.

In addition, there is encountered a problem in that it is impossible to concurrently execute the applications after the users are made to recognize a risk of concurrently executing such applications. To cope with the problem, it is conceivable to provide an application management system where application concurrent execution can be restricted without previously setting restriction conditions for each application on an image processing device side by embedding concurrent start restriction information in the application itself. However, there is also a problem in that it is difficult to adapt to a case where the concurrent execution restriction is not desired depending on a version or type of devices on which the application is operated, or the like.

SUMMARY OF THE INVENTION

The present invention has been made in view of the above-mentioned problems and therefore there is provided an application management system capable of appropriately restricting application concurrent execution depending on an image processing device that operates the application.

According to an aspect of the present invention, there is provided an application management system for managing a plurality of applications installed in an image processing device, including: a start instruction reception unit for receiving an instruction of execution start of the applications; an application execution unit for executing the application whose instruction of execution start has been received by the start instruction reception unit; and a warning screen output unit for outputting a warning screen about the application execution start, in which in the case where the start instruction reception unit receives an instruction of execution start for a first application, if the application execution unit has already executed an incompatible application that would cause an unintended operation of the first application if concurrently executed with the first application, the application execution unit does not start the first application execution and the warning screen output unit outputs a warning screen about the first application execution start.

According to another aspect of the present invention, there is provided an application management system for managing a plurality of applications installed in an image processing device, including: a start instruction reception unit for receiving an instruction of application execution start; an application execution unit for executing an application whose instruction of execution start is received by the start instruction reception unit; and a warning screen output unit for outputting a warning screen about the application execution start, in which in the case where the start instruction reception unit receives the instruction of execution start for a first application, when the application execution unit has already executed an application that would involve an unintended operation of its own application if concurrently executed with the first application, the application execution unit does not start the first application execution, and the warning screen output unit outputs a warning screen about the first application execution start.

According to another aspect of the present invention, there is provided an application management method of managing a plurality of applications installed in an image processing device and executed by an application execution unit, including: a start instruction reception step of receiving an instruction of application execution start; a control step of restricting the application execution unit to start execution for an first application in the case where in response to the instruction of execution start for the first application received in the start instruction reception step, the application execution unit has already executed an incompatible application that would cause an unintended operation of the first application if concurrently executed with the first application; and a warning screen output step of outputting a warning screen about the first application execution start when the application execution unit executes the incompatible application.

According to another aspect of the present invention, there is provided an application management method of managing a plurality of applications installed in an image processing device and executed by an application execution unit, including: a start instruction reception step of receiving an instruction of application execution start; a control step of restricting the application execution unit to start execution for an first application in the case where in response to the instruction of execution start for the first application received in the start instruction reception step, the application execution unit has already executed an application that would involve an unintended operation of its own application if concurrently executed with the first application; and a warning screen output step of outputting a warning screen about the first application execution start.

Furthermore, according to another aspect of the present invention, there are provided a program for causing an application management system to execute the above-mentioned application management method and a computer-readable storage medium for storing the program for causing a computer to execute the above-mentioned application management method.

According to the present invention, it is unnecessary to previously set restriction conditions for each application on a device side (on a system side) and such a situation can be prevented where a plurality of applications that are not desired to be concurrently are executed unintentionally by a user, thereby improving the convenience for the user.

In addition, according to the present invention, it is possible to concurrently execute the applications by a decision of the user after the user is made to realize the risk of concurrently executing the applications, thereby making it possible to manage the applications in a more flexible manner.

Moreover, according to the present invention, it is also possible to provide the flexible application management system in which the applications can be concurrently executed after the user is made to realize the risk of concurrently executing the applications instead of just completely restricting the concurrent execution of the applications.

Further features of the present invention will become apparent from the following description of exemplary embodiments with reference to the attached drawings.

BRIEF DESCRIPTION OF THE DRAWINGS

FIGS. 16A to 16C show an example of attribute information owned by the respective applications according to the first embodiment of the present invention.

FIGS. 19A to 19C show an example of attribute information owned by the respective applications according to the second embodiment of the present invention.

DESCRIPTION OF THE EMBODIMENTS

Hereinafter, with reference to the drawings, preferred embodiments of the present invention will be described in detail for illustrative purposes. However, constituent elements described in the embodiments are merely for illustrative purposes and should not be construed as limiting the scope of the invention.

First Embodiment

Figure 1:
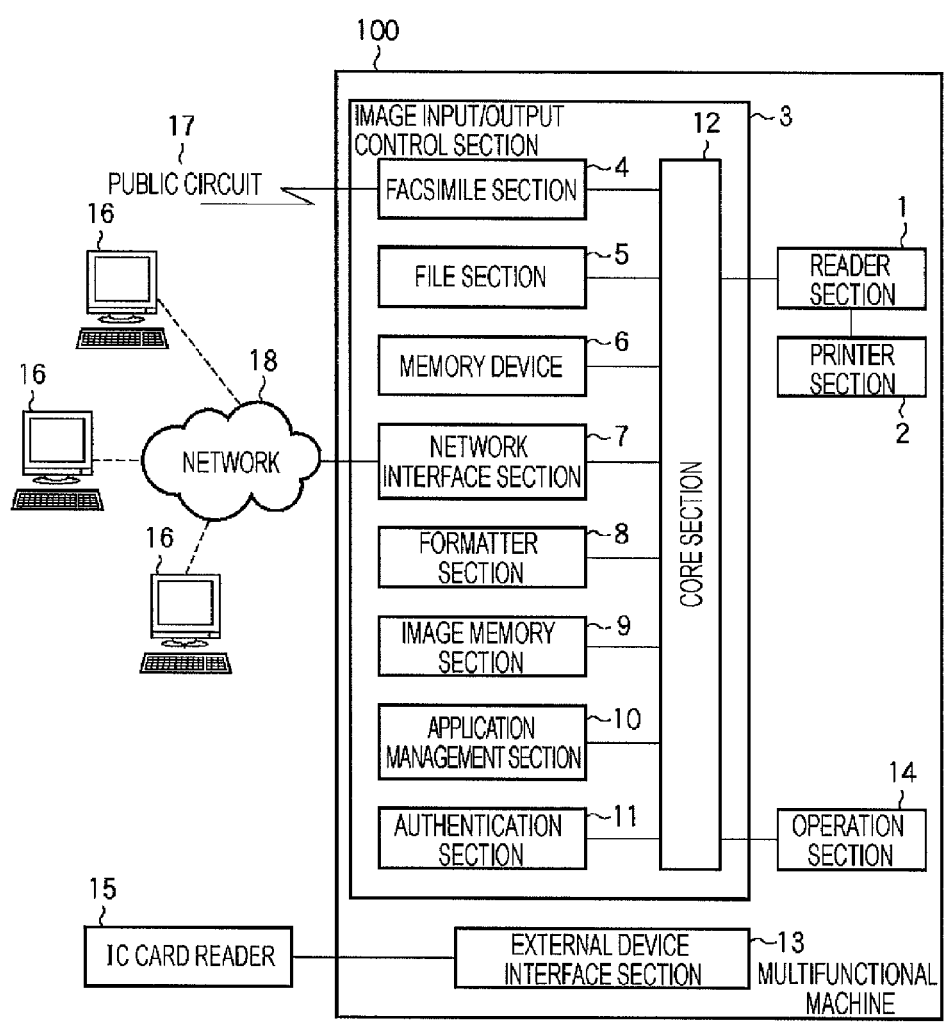
FIG. 1 is a block diagram showing a construction of an image processing system to which an application management system is applied according to an embodiment of the present invention.

FIG. 1 is a block diagram showing a construction of an image processing system to which an application management system according to the present invention is applied. In FIG. 1, a multifunctional machine 100 that is a preferred example of an image forming apparatus or an image processing device in the image processing system constitutes a multifunctional machine for integrating a plurality of functions of a scanner, a printer, a copier, and a facsimile machine.

The multifunctional machine 100 is mainly composed of a reader section 1, a printer section 2, and an image input/output control section 3. The reader section 1 is connected to the printer section 2 and the image input/output control section 3. The reader section 1 reads out an original to generate image data and outputs the read image data to the printer section 2 or the image input/output control section 3. The printer section 2 prints out the image data output from the reader section 1 and the image input/output control section 3 on a sheet of recording paper. The image input/output control section 3 conducts input and/or output of the image data by using an external network, a public circuit, and a storage device 6. Also, the image input/output control section 3 performs management of an authentication process in which a user uses the multifunctional machine 100 and management of applications operated on the multifunction machine.

The image input/output control section 3 is structured by a facsimile section 4, a file section 5, the storage or memory device 6, a network interface section 7, a formatter section 8, an image memory section 9, an application management section 10, an authentication section 11, and a core section 12.

The facsimile section 4 is connected to the core section 12 and a public circuit 17. The facsimile section 4 expands compressed image data received from the public circuit 17 and sends the expanded data to the core section 12. Furthermore, the facsimile section 4 compresses the image data sent from the core section 12 and sends the compressed image data to the public circuit 17.

The file section 5 is connected to the core section 12 and the storage device 6. The file section 5 compresses the image data sent from the core section 12 and writes the compressed image data in the storage device 6. Furthermore, in response to a request from the core section 12, the file section 5 reads out the compressed image data from the storage device 6, expands the data, and sends the expanded data to the core section 12. It should be noted that the storage device 6 may be structured by using an external storage device.

The network interface section 7 is an interface for connection to an external network 18. Reception of job control data from the computer 16 that is connected to the network and send of the image data or the like to the computer 16 are performed via the network interface section 7. The job control data includes job control command sent together with page description language (PDL) data. For example, there is a command for staple sort and paper discharge after the PDL data is converted and printed as the image data. In the network interface section 7, a database is constructed, which is called management information base (MIB), where communication is performed with computers (not shown in the drawing) on the network via a simple network management protocol (SNMP), making it possible to manage the printer section 2.

The formatter section 8 is connected to the core section 12, and the PDL data sent from the computer connected via the network is expanded into image data by this section, which can be printed by the printer section 2.

The image memory section 9 is adapted to temporarily accumulate information sent from the reader section 1 and information sent from the computer 16 via the network interface section 7.

The operation section 14 is a user interface for allowing the user to operate functions provided by the multifunctional machine 100.

The application management section 10 stores applications received from the computer 16 via the network interface section 7 in the storage device 6 for enabling operations on the multifunctional machine, controlling the application, etc.

An external device interface section 13 is an interface for connecting a peripheral device such as IC card reader 15 to the multifunctional machine 100. The external device interface section is used for example when authentication employing an IC card or the like is conducted.

The authentication section 11 performs an authentication process on the basis of authentication information input from the IC card reader 15 or the like that is connected to the operation section 14 or the external device interface section 13.

The core section 12 governs entire control of the multifunctional machine 100 including control of data exchanged among the above-mentioned reader section 1, the facsimile section 4, the file section 5, the network interface section 7, the formatter section 8, the image memory section 9, the application management section 10, the authentication section 11, the external device interface section, and the operation section 14 and analysis of the job control data. It should be noted that the core section 12 includes a central processing unit (CPU), a random access memory (RAM), and a read only memory (ROM), which are not shown in the drawing. The application stored in the ROM or the storage device 6 is loaded to the RAM and executed by the CPU in the core section 12.

Figure 2:
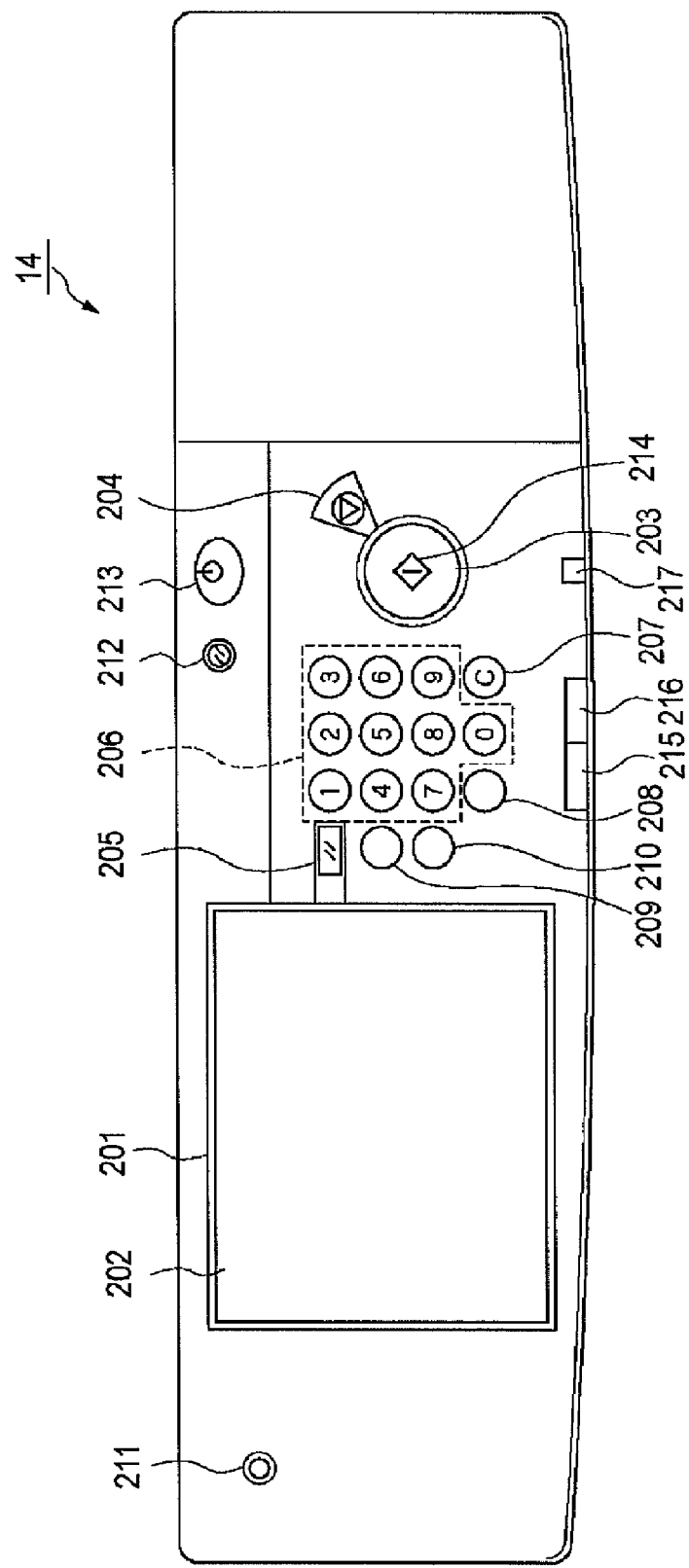
FIG. 2 shows an example of an external appearance of an operation section in a multifunctional machine.

FIG. 2 shows an example of an external appearance of the operation section 14 in the multifunctional machine 100 shown in FIG. 1. In a liquid crystal display (LCD) section 202, a touch panel sheet 201 is affixed on a LCD for displaying an operation screen of the system and soft keys. When the displayed key is pressed, the core section 12 is notified of information on the location. A start key 203 is used when reading operation of an original image or the like is started. At center portions of the start key 203, there are two light emitting diodes (LEDs) 214 with colors of green and red, indicating whether or not the start key 203 is an effective status depending on the color. A stop key 204 has a function of stopping an activating operation. A reset key 205 is used for reset the setting from the operation section. A ten key keyboard 206 is used for inputting numerical values. A clear key 207 is used for clearing the input numerical values.

An ID key 208 is used for triggering login to the device or logout from the device. A guide key 209 is used for displaying a help menu about setting and an input method. A user mode key 210 is used for performing particular setting related to the device operation or detailed setting. A counter key 211 is used for checking the number of sheets that have been printed by the device. A power save key 212 is used for putting the device in a standby mode to suppress consumed power. A power key 213 is used for turning a power source of the device ON or OFF. Tally lights 215 and 216 are adapted to be flashing and turned on when the respective devices are operating and when some abnormality occurs in the device. A power light 217 is turned on when the power source of the device is turned on by the power key 213.

Figure 3:
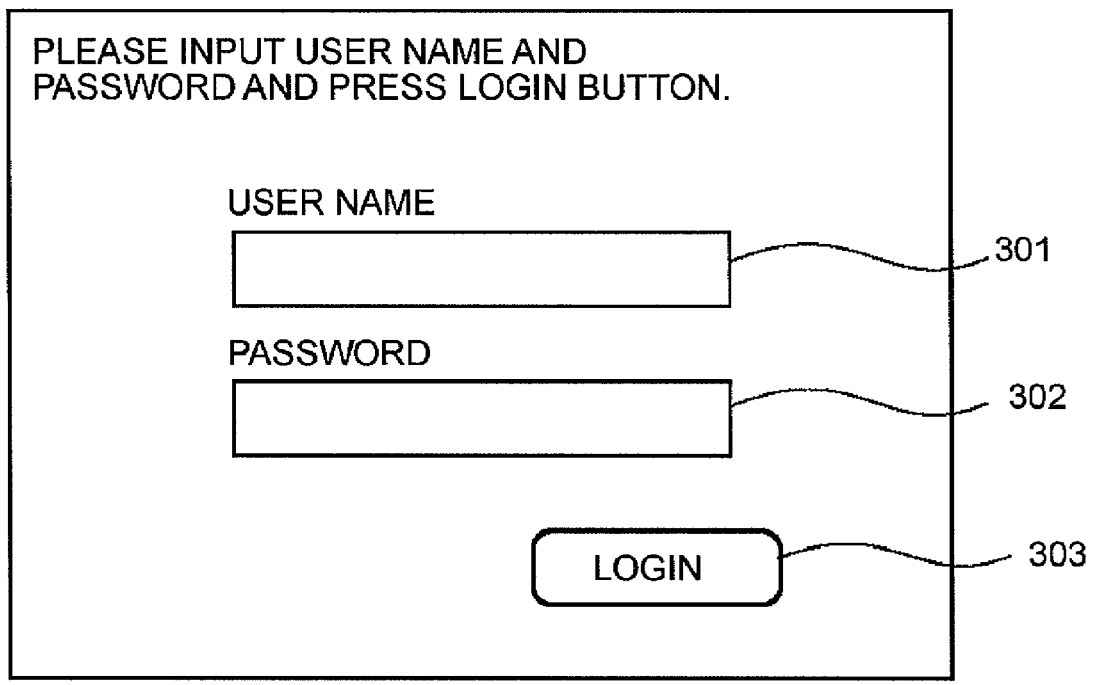
FIG. 3 shows a display example of an authentication screen to be displayed on a LCD display section.

FIG. 3 shows an example of an authentication screen to be displayed on the LCD display section 202 shown in FIG. 2. This screen is displayed when the functions installed in the multifunctional machine 100 are available. Also, this screen is displayed when the user performs login from this screen and logout after using the functions installed in the multifunctional machine 100. Furthermore, this screen is displayed when logout is automatically performed after a certain period of time elapses without any input into the operation section even when the user is in the login status.

In FIG. 3, a user name input field 301 is a field for inputting a user name therein. By touching this field, a virtual key board (not shown in the drawing) is displayed on the LCD display section 202, whereby the user can input the user name therein. A character string thus input is displayed as it is on this field.

The password input field 302 is a field for inputting a password corresponding to the user name. By touching this field, a virtual key board (not shown in the drawing) is displayed on the LCD display section 202, whereby the user can input a password. A character string thus input is displayed after conversion into a symbol such as "*". As a result, other people cannot find out the password even when looking at the screen.

Furthermore, in FIG. 3, a login button 303 is a button for performing login to use the functions of the multifunctional machine 100. When the login button 303 is pressed, authentication is performed on the basis of information input into the user name input field 301 and the password input field 302. If the input information is correct, a login process is performed and an application screen is displayed. On the other hand, if the input information is incorrect, an error screen (not shown in the drawing) is displayed, and thereafter the login screen of FIG. 3 is displayed again.

Figure 4:
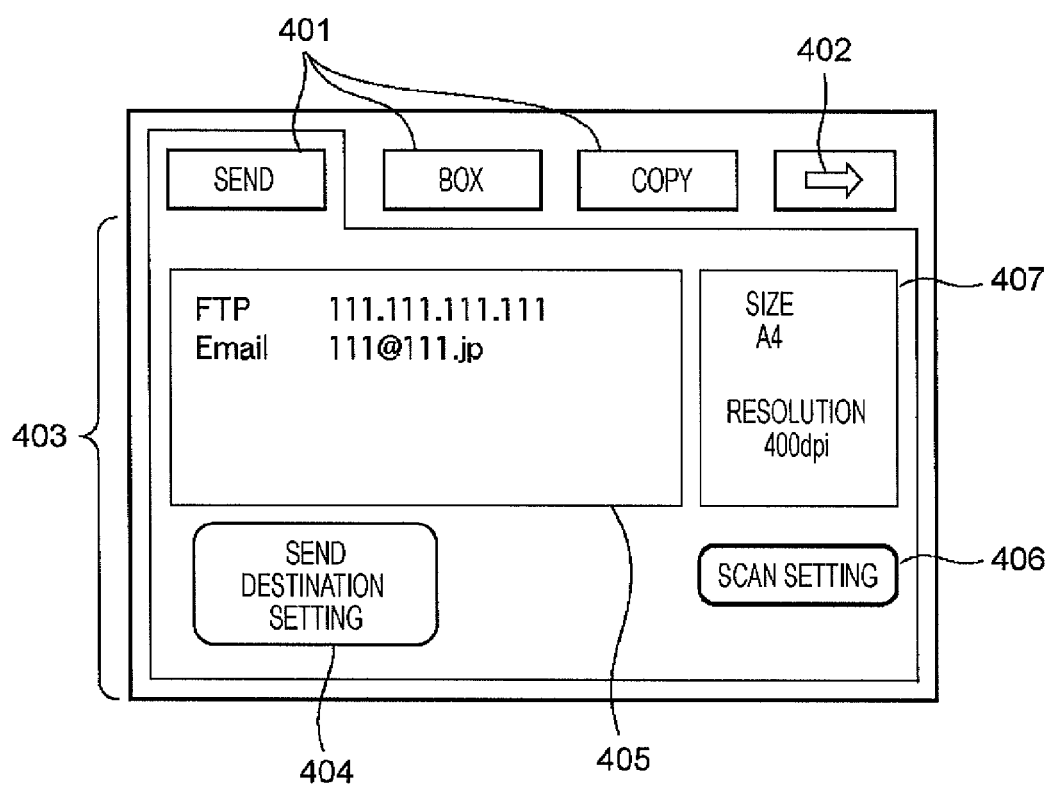
FIG. 4 shows an example of an application screen to be displayed after the login.

FIG. 4 shows an example of an application screen to be displayed after the login. Application switching tabs 401 are adapted to install an application ready to be started. An application group switching button 402 is displayed when all the application tabs are not displayed in one screen, with which the applications selectable by the application switching tabs are switched. An application screen display area 403 displays an application screen of the currently selected tab. It should be noted that the application screen of FIG. 4 is an example of a send application screen. The send application is an application for specifying a scan condition and a destination, and sending the image read in the reader section 1 to the specified destination by pressing the start key 203.

Furthermore, in FIG. 4, a send destination address setting button 404 is adapted to set the send destination of the scanned image. The send destination address list 405 displays send destination addresses set by the send destination address setting button 404. A scan setting button 406 is a button for setting scan conditions such as a reading resolution at the time of scanning. A scan setting display area 407 displays the scan conditions set by the scan setting button 406.

When a copy application or a box application is selected by pressing down the application switching tabs, a setting screen for the selected application is displayed.

FIGS. 5 to 10 show examples of application management tool screens for managing the applications. According to this embodiment, if the application management tool is mounted in the multifunctional machine 100 as a WEB application, the application management tool is connected to the multifunctional machine 100 from the computer connected via the network using a web browser. Therefore, the display screens of FIGS. 5 to 10 become web browser screens of the computer connected to the multifunctional machine 100 via the network. However, the application management tool screens may be displayed on the LCD display section 202 of the operation section 14 in the multifunctional machine 100 and operated by the operation section 14.

Figure 5:
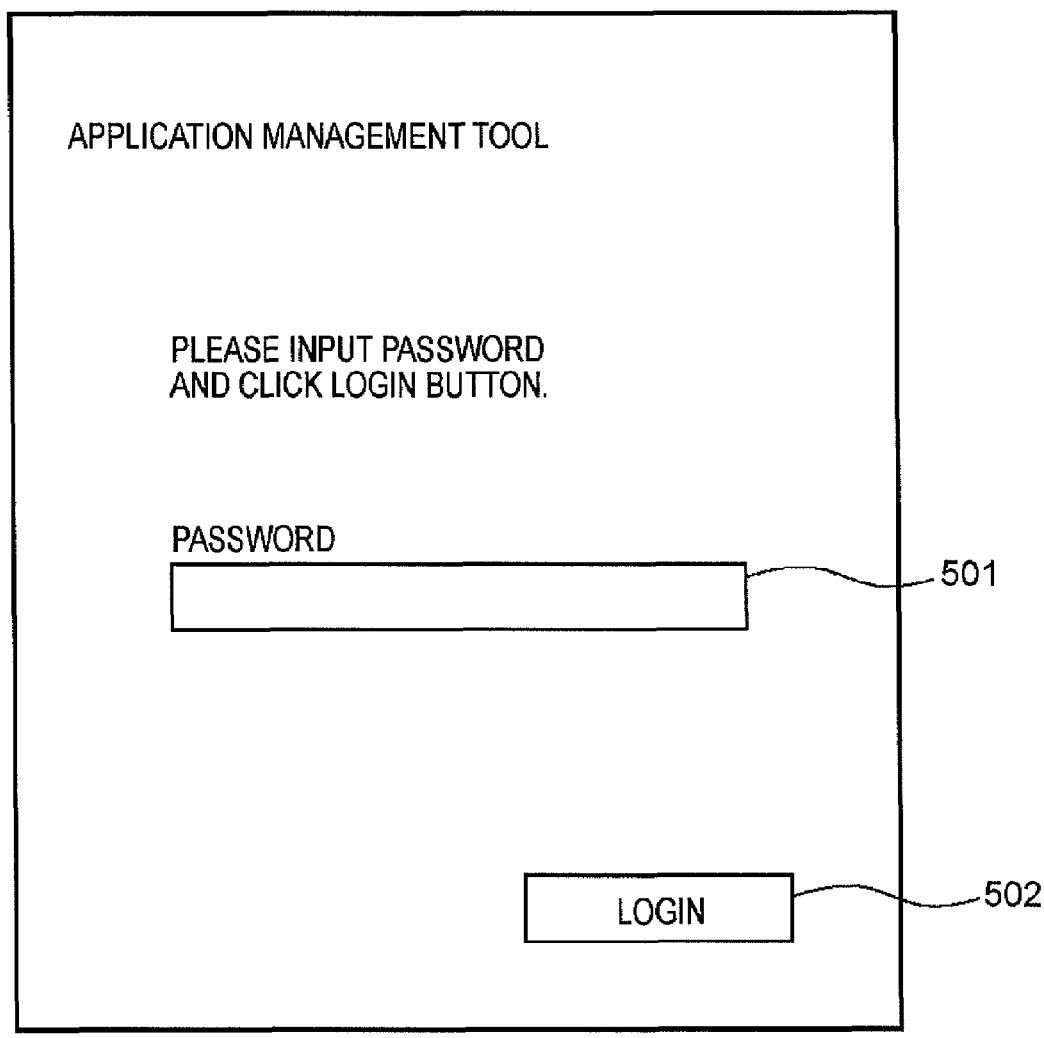
FIG. 5 shows an example of the authentication screen for using an application management tool.
Figure 6:
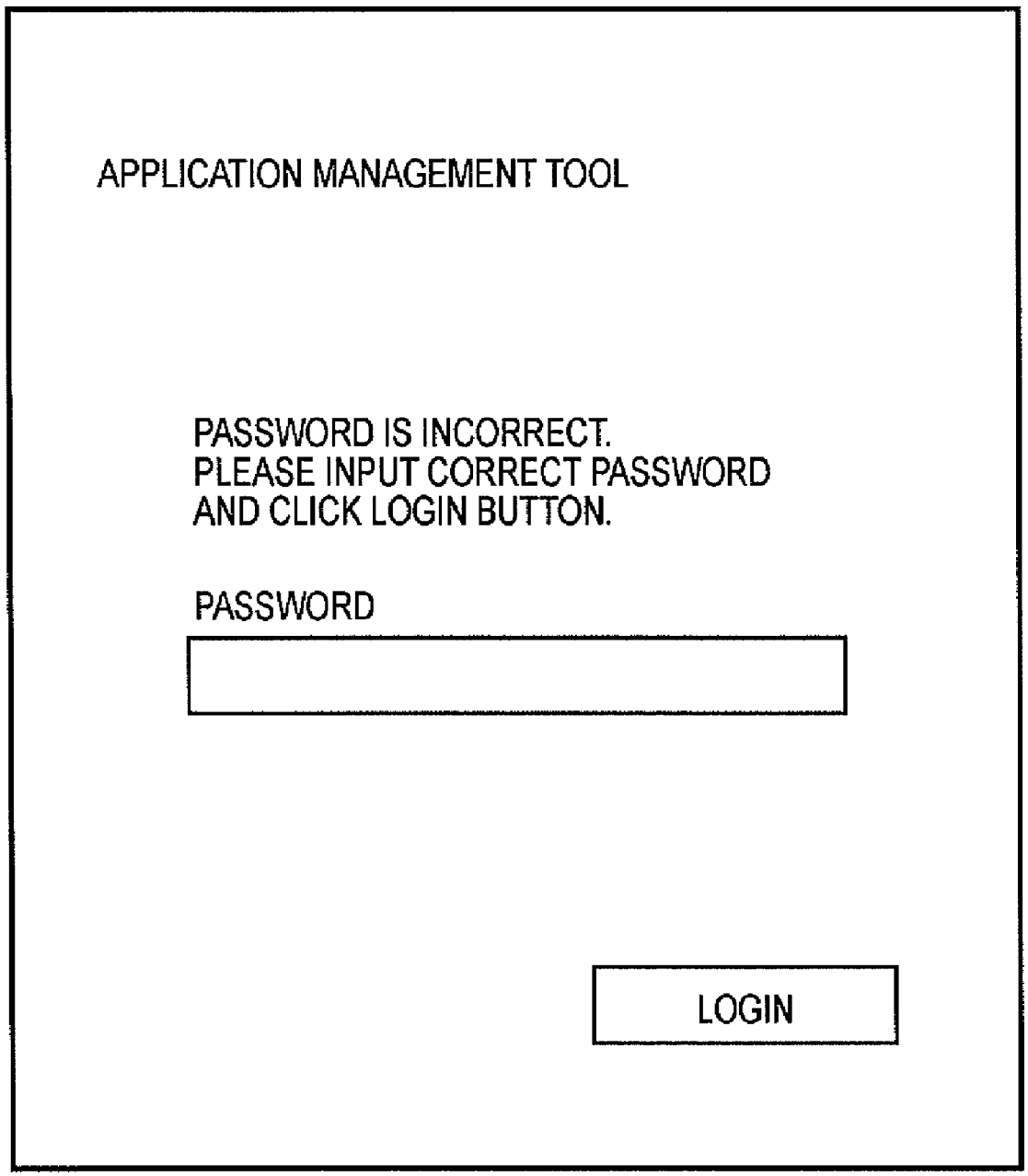
FIG. 6 shows an example of an error screen displayed when an incorrect password is input in the authentication screen of the application management tool.

FIG. 5 shows an example of the authentication screen for using the application management tool. When the user operates the web browser on the computer to access the image forming apparatus (the multifunctional machine 100), this screen is displayed first. A password input field 501 is adapted for inputting a password. When the user inputs an incorrect password in the password input field 501 and clicks a login button 502, an error screen of FIG. 6 is displayed, whereby the application management tool cannot be used. That is, FIG. 6 shows an example of the error screen when an incorrect password is input in the authentication screen of the application management tool.

Figure 7:
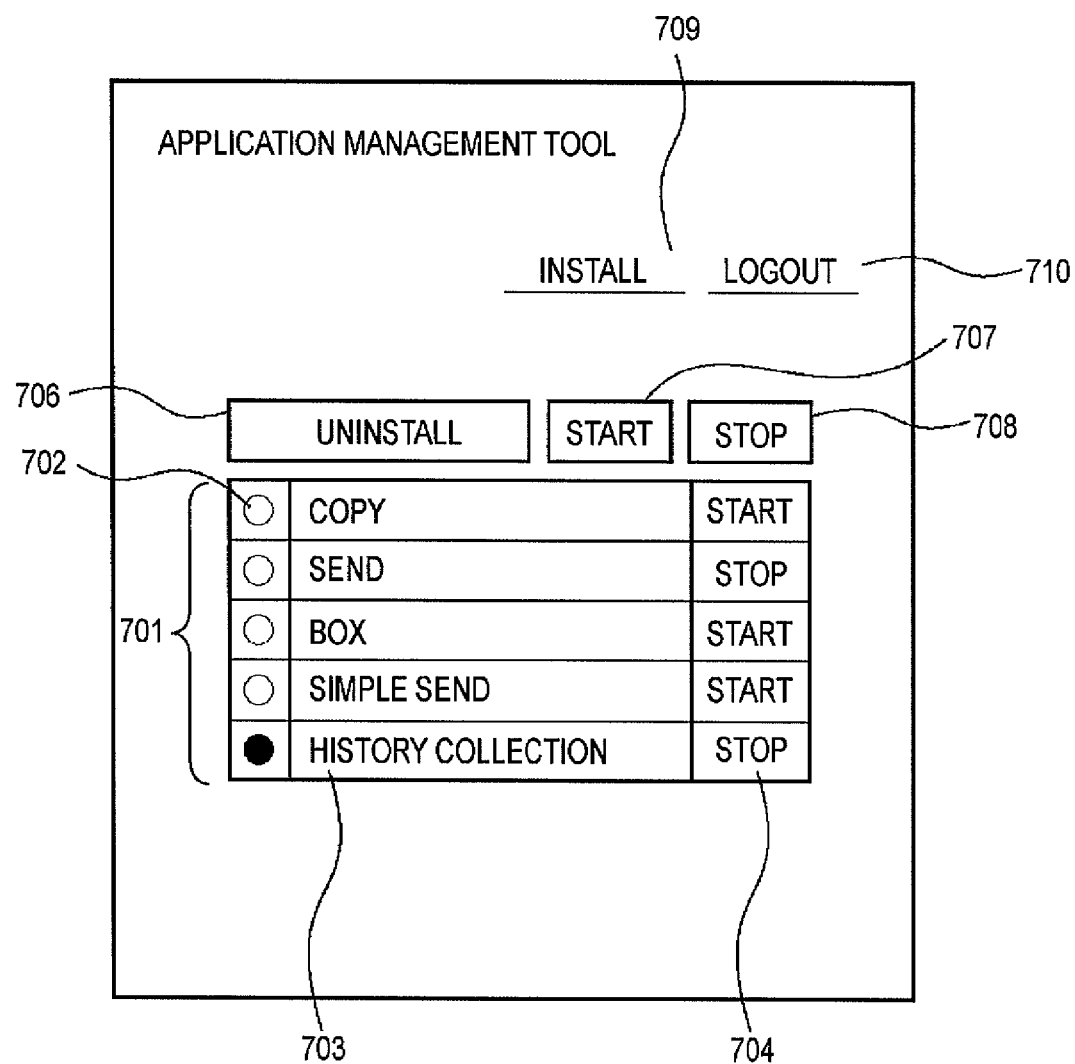
FIG. 7 shows an example of an application list screen that is a main screen of the application management tool.

On the other hand, when the user inputs a correct password in the password field 501 and clicks the login button 502, an authentication list screen shown in FIG. 7 is displayed. FIG. 7 shows an example of the authentication list screen that is a main screen of the application management tool.

In FIG. 7, an application list 701 corresponds to a region where a list of applications that are installed in the multifunctional machine 100 is displayed. The application list is composed of a radio button 702, an application name 703, and an application status 704. The radio button 702 is used for the operations on the application selection by the user.

In the display example of FIG. 7, "history collection" is selected. The application name 703 represents a name of an application installed in the multifunctional machine 100. The application status 704 represents a status of the application. The application status represents a stop status or a start status. An application in the stop status is installed in the multifunctional machine 100 but not executed. On the other hand, an application in the stop status is activated and executed by the CPU (not shown in the drawing) which is installed in the core section 12.

An uninstall button 706 is a button for uninstalling the application. When this button is pressed, the application selected by the radio button 702 is uninstalled. A stop button 708 is a button for stopping the application. When this button is pressed, the application selected by the radio button 702 is subjected to a stop process. If the stop process is successful, the application is in the stop status. It should be noted that no processes are performed on applications originally in the stop status. A start button 707 is a button for starting the application. When this button is pressed, the application selected by the radio button 702 is subjected to a start process. If the start process is successful, the application is in the start status. It should be noted that no processes are performed on applications originally in the start status even when the start button 707 is pressed.

An install button 709 is a link to an application install screen (not shown in the drawing). From this link destination, a new application can be installed. The installed application is displayed on the application list 701.

Then, a logout button 710 is adapted to be used for logout. When this link is clicked, the authentication screen of FIG. 5 is displayed.

It should be noted that when no operations are conducted for a certain period of time on the authentication list screen shown in FIG. 7, automatic logout is performed. Even when the screen operation is conducted after that, the screen may be returned to the screen of FIG. 5 for repeating login.

A history collection application is an application for collecting operation history of various operations in the multifunctional machine 100 such as a copy operation, a print operation, a FAX send/reception operation. However, the history collection application is not adapted to collect all the operations in the multifunctional machine 100, and therefore there are some operations that are not covered by the operation count in the multifunctional machine 100. If an application including operations which are not covered by the operation count in the history collection application is run at the same time as the history collection application, the latter application may not work as intended. For example, if the operation history of a box application or a simple send application is not covered by the history collection application, the history of operations by these applications cannot be collected. In view of the above, according to this embodiment, it is assumed that the history collection application is not desired to be concurrently executed with the box application or the simple send application.

According to this embodiment, an application for performing an operation that is covered by the history collection application is referred to as an application compatible with the history collection application. On the other hand, an application for performing an operation that is not covered by the history collection application is referred to as an application incompatible with the history collection application. In the example of FIG. 7, the copy application and the send application are applications compatible with the history collection application. On the other hand, the box application and the simple send application are applications incompatible with the history collection application.

Figure 8:
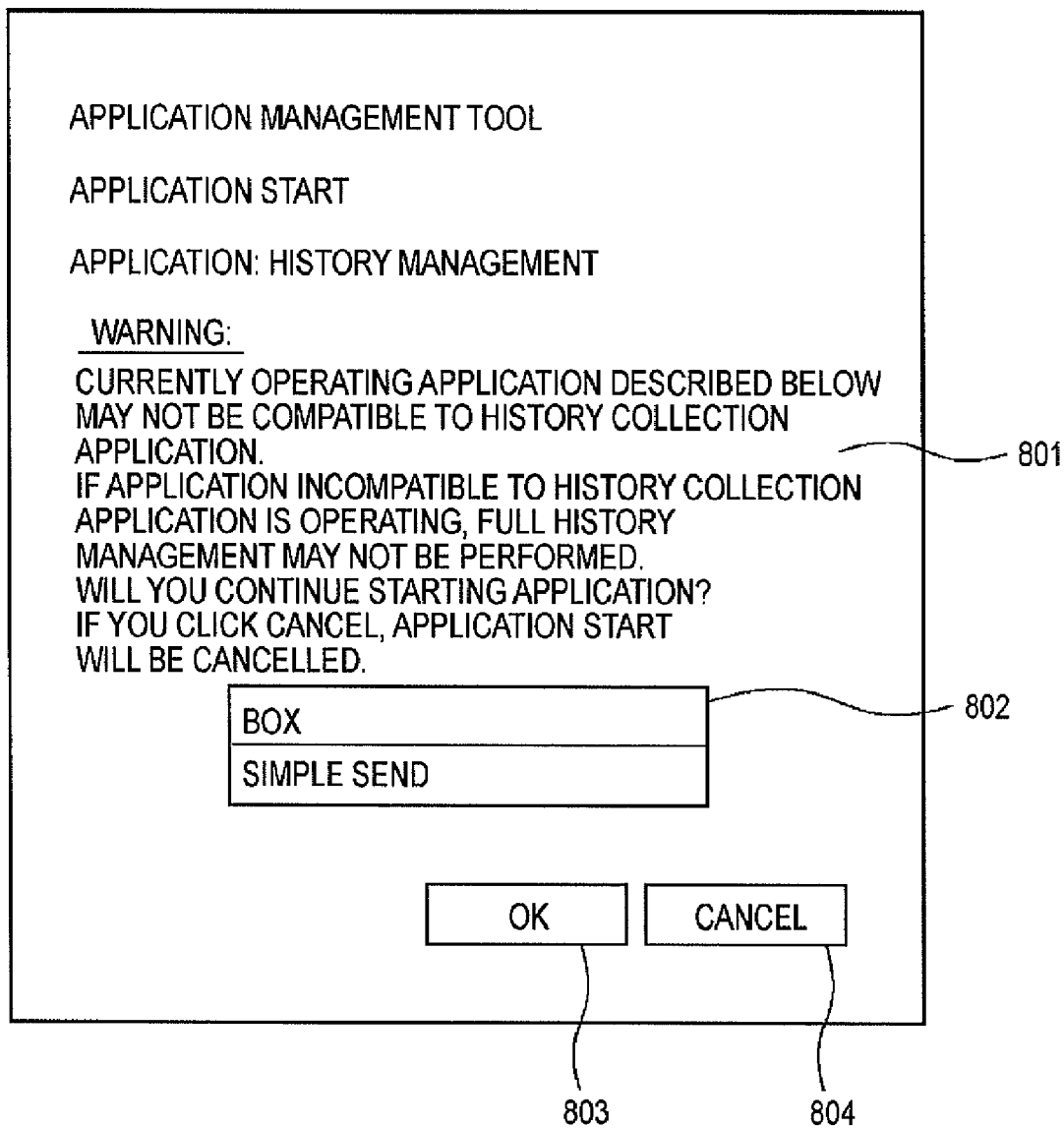
FIG. 8 shows an example of a warning screen displayed in the case where at the start of an application, another application that is not desired to be concurrently executed with the application has been already executed.

FIG. 8 shows an example of a warning screen at the time of starting a second application when another application that is not desired to be concurrently executed is operating. The screen example is displayed when the history collection application is started from the status of the example shown in FIG. 7. In this screen, a warning message 801 is a warning message defined by the history collection application. An application list 802 is a list of already-executed applications that are not desired to be concurrently executed. In this screen, when an OK button 803 is clicked, the application start process is conducted and the authentication list screen of FIG. 7 is displayed. On the other hand, when a cancel button 804 is clicked, the application start process is not conducted and the authentication list screen of FIG. 7 is displayed. In this way, while the user checks this screen, it is possible for the user to find out the applications which might cause a problem if concurrently executed. As a result, the application management can be flexibly performed according to the situation.

Herein, FIGS. 16A to 16C show examples of attribute information of the respective applications that are used in the example of FIG. 8. A file of the application itself may include the attribute information or may be a separate file. When the attribute information is a separate file, AppId is used for uniquely identifying the application in the attribute information associated with the application. FIG. 16A shows an example of the attribute information of the history collection application. AppId is an ID for uniquely identifying the application. AppName is a name of the application. Information described in this field is displayed as the application name 703 of FIG. 7. Vendor is a field for information indicating a supply source of the application. Require 1601 is a field which is set for applications which may require to be restricted. The Require field uses a keyword (code). That is, a code is provided in the attribute information, whereby it is possible to display a warning screen when the applications which do not include the keyword in the attribute information are going to be concurrently executed (i.e. two incompatible applications). This example means that the concurrent execution of the applications incompatible to a LogManagement function is desired to be restricted.

FIG. 16B shows an example of attribute information of the copy application. A Compatible field 1602 represents a declaration of being compatible with a certain function. In this case, the copy application is compatible with the LogManagement function. In other words, as the copy application is compatible with the LogManagement function which the history collection application requires, when the concurrent execution is tried, the warning screen is not displayed.

Then, FIG. 16C shows an example of an attribute of the simple send application. The simple send is not compatible to the history collection function, and thus there is no description of the Compatible field 1602. For this reason, when it is intended that the history collection application and the simple send application are concurrently executed, the warning screen is displayed.

Therefore, as "Compatible: LogManagement" is declared in the attribute information of the application compatible to the history collection application, the application incompatible to the history collection application does not have a Compatible field or a declaration of LogManagement in the Compatible field.

This attribute information can be set by a developer of the application. Then, by comparing the fields Compatible and Require in the attribute information of the application, it is possible to judge whether or not the application can be concurrently executed. As a result, when a given application is installed, it is unnecessary to set the capability of the concurrent execution with other applications again. Therefore, the application management by an administrator of the multifunctional machine 100 becomes extremely easy.

Figure 9:
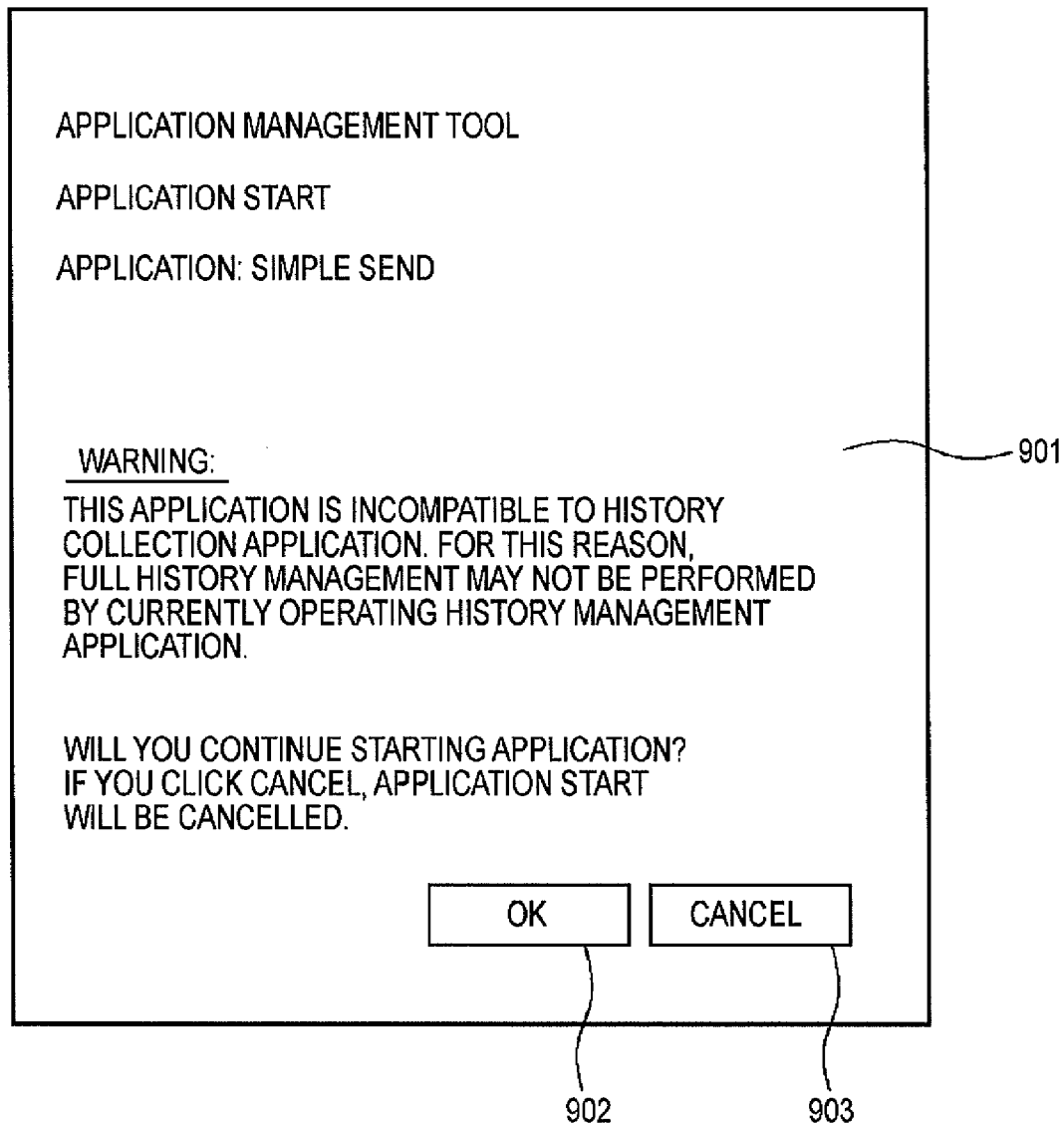
FIG. 9 shows an example of a warning screen displayed in the case where at the execution start of an application, another application that causes a problem if concurrently executed with the application has been already executed.

FIG. 9 shows an example of a warning screen displayed at the time of instruction start of an application from the screen of FIG. 7 in the case where another application that might cause a problem if concurrently executed with the application has already been executed. This example shows the case in which, while the history collection application has been already executed, start of the simple send application is instructed. Herein, a warning message 901 is a warning message defined by the history collection application. In this screen, when an OK button 902 is clicked, the start process of the application subjected to the start instruction is performed and the authentication list screen of FIG. 7 is displayed.

Alternatively, when a cancel button 903 is clicked, the start process of the application subjected to the start instruction is not performed and the authentication list screen of FIG. 7 is displayed.

Before the start of application execution, if the Compatible item in the attribute information of the application that is desired to be started and executed and the Require item in the attribute information of the application that has been already started are compared with each other, it is possible to judge whether or not both the applications may be concurrently activated. When there are a plurality of applications that have been already started, comparison with the Require item of the respective executed applications is performed.

Figure 10:
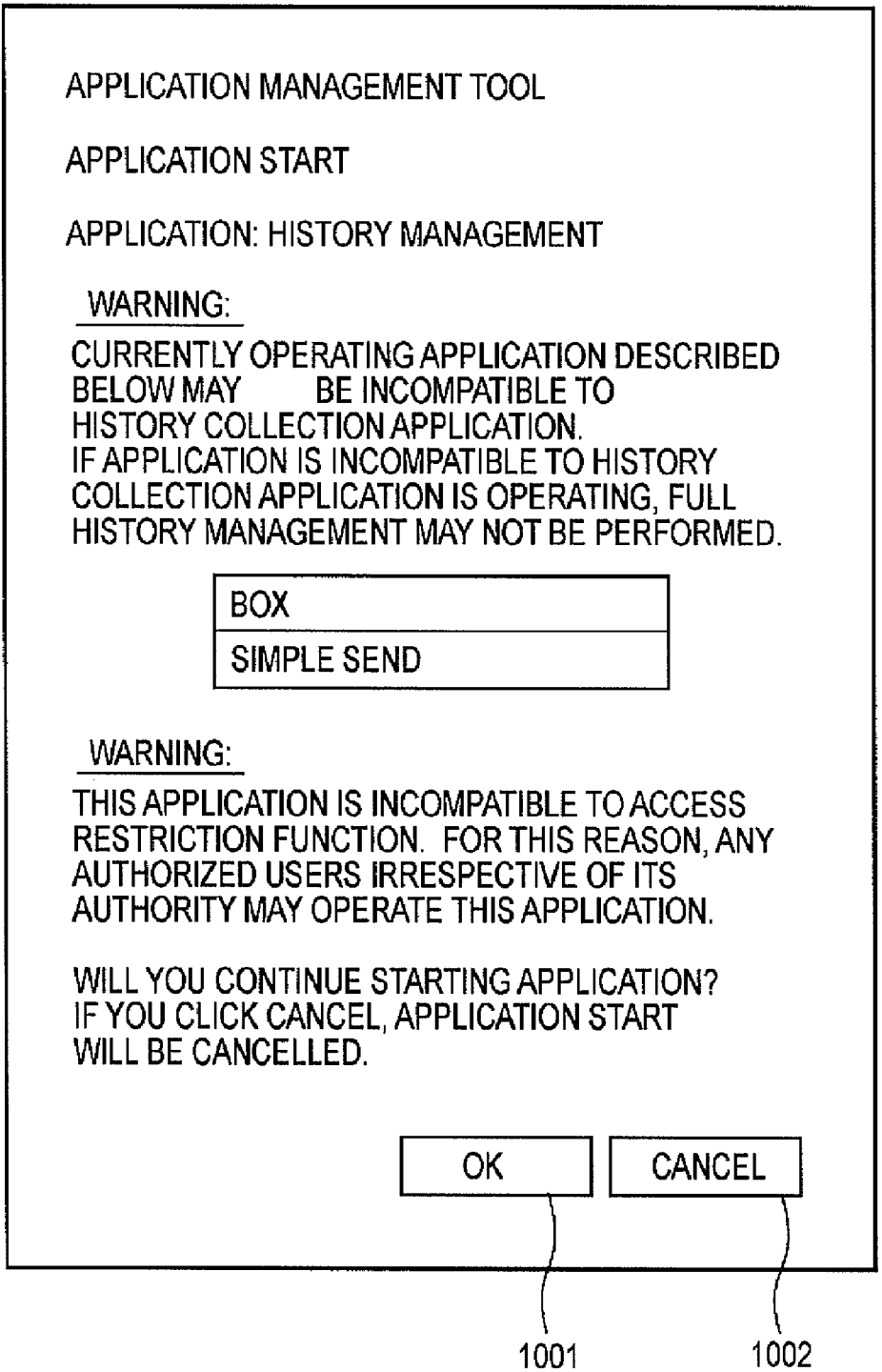
FIG. 10 shows an example of a warning screen displayed at the time of application start.

FIG. 10 shows an example of a warning screen displayed when the application is started. The warning screen is displayed when another application that might cause a problem if concurrently executed with the application has already been executed and at the same time when an application with which the application desired to be started prefers not to concurrently operate has already been executed. In this case, in addition to the status shown in FIG. 7, it is assumed that an application provided with an access control function (access restriction application) has been already executed and the history collection application is not compatible to the access control function. In other words, the history collection application does not meet a condition declared in the Require field of the access restriction application. In this case as well, similarly to the cases of FIGS. 8 and 9, when an OK button 1001 is clicked, the start process of the application subjected to the start instruction is performed and the screen is shifted to the authentication list screen of FIG. 5. On the other hand, when a cancel button 1002 is clicked, the start process of the application subjected to the start instruction is not performed and the screen is shifted to the application list screen of FIG. 7.

Figure 11:
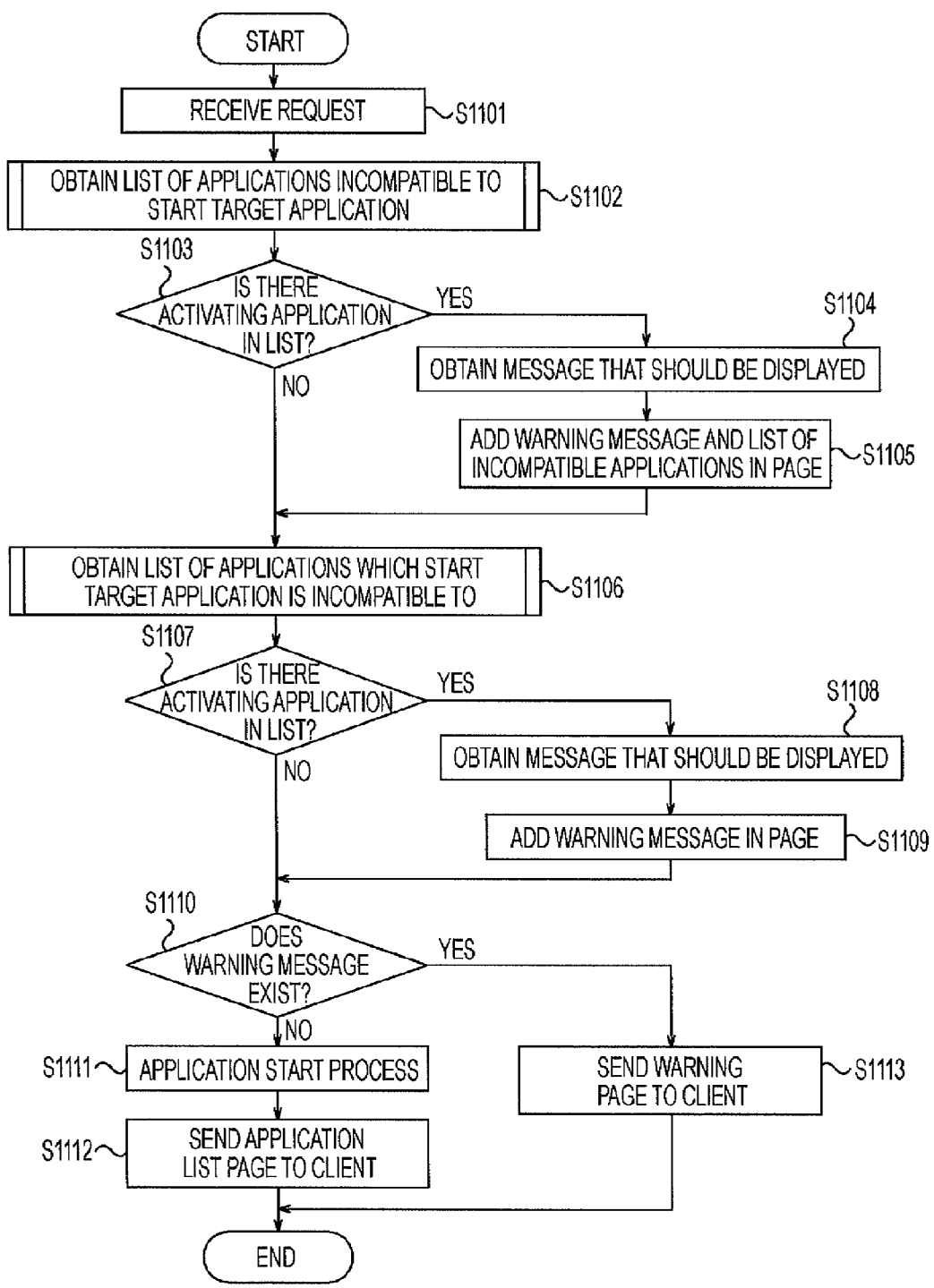
FIG. 11 is a flowchart for describing a process flow of the application management system in the case where the user clicks start of the application on the authentication list screen of FIG. 5.

FIG. 11 is a flowchart for describing a process flow of the application management system when the user clicks the application start in the authentication list screen of FIG. 5. This flowchart is executed by the CPU (not shown in the drawing) which is installed in the core section 12 of the multifunctional machine 100.

First of all, in Step S1101, an application start request is received from the computer 16 or the like. Next, the process proceeds to Step S1102, where a process of obtaining a list of applications incompatible to the specified application is performed. It should be noted that a detail of the process in Step S1102 will be described with reference to FIG. 12. Next, the process proceeds to Step S1103 to judge whether or not there is an application being executed in the applications obtained in S1102. As a result, when there is an application being executed (YES), the process proceeds to Step S1104 to obtain a message that should be displayed from the application whose start has been instructed. Next, the process proceeds to Step S1105, where the message that should be displayed and a list of applications being executed among the incompatible applications are arranged in the page. Then, the process proceeds to Step S1106. It should be noted that at the time of displaying the warning message, the process by the application whose start has been instructed is not immediately executed and a control for temporarily holding the start standby is performed.

On the other hand, in Step S1103, when it is judged that no applications being executed exist (NO), the process proceeds to Step S1106.

It should be noted that, the process of Step S1102 and the process of Step S1103 may be replaced by the following processes. To elaborate, a list of applications currently being executed is obtained, and it is judged that there is an application incompatible to the start target application in the list. In this judgment, when there is an application incompatible to the start target application, the process proceeds to Step S1104. On the other hand, when all applications are compatible to the start target application, the process proceeds to Step S1106.

In Step S1106, a list of applications that are not compatible to the application whose start has been instructed in the control target applications of the application management system is obtained. It should be noted that a detail of the process in Step S1106 will be described later with reference to FIG. 13. Next, the process proceeds to Step S1107, where it is judged whether or not there is an application being executed in the list of applications obtained in Step S1106. As a result, in Step S1107, when it is judged that there is an application being executed (YES), the process proceeds to Step S1108. In Step S1108, a message that should be displayed is obtained from the application being executed, and the process proceeds to Step S1109. In Step S1109, the message obtained in Step S1108 is arranged in a response page to the request, and the process proceeds to Step S1110. It should be noted that at the time of displaying the warning message, the process by the application whose start has been instructed is not immediately executed and a control for temporarily holding the start standby is provided.

On the other hand, in Step S1107, when it is judged that no applications being executed exist (NO), the process proceeds to Step S1110 without performing any operation.

It should be noted that, the processes of Steps S1106 and S1107 may be replaced by the following processes. To elaborate, a list of applications currently being executed is obtained, and it is judged whether or not there is an application incompatible with the start target application in the list. In this case, when there is an application incompatible with the start target application, the process proceeds to Step S1108. When all the applications are compatible to the start target application, the process proceeds to Step S1110. In Step S1110, in Step S1105 or S1109, or in Steps S1105 and S1109, it is judged whether or not the warning message screen is generated. As a result, when it is judged that the warning message screen is generated (YES), the process proceeds to Step S1113, where the generated warning message screen is sent to the client to finish the process.

On the other hand, in Step S1110, when it is judged that the warning message screen is not generated (NO), the process proceeds to Step S1111. In Step S1110, the start process of the specified application is conducted, and the process proceeds to Step S1112. In Step 1112, an application list page is generated and sent to the client, thereby finishing the process.

Figure 12:
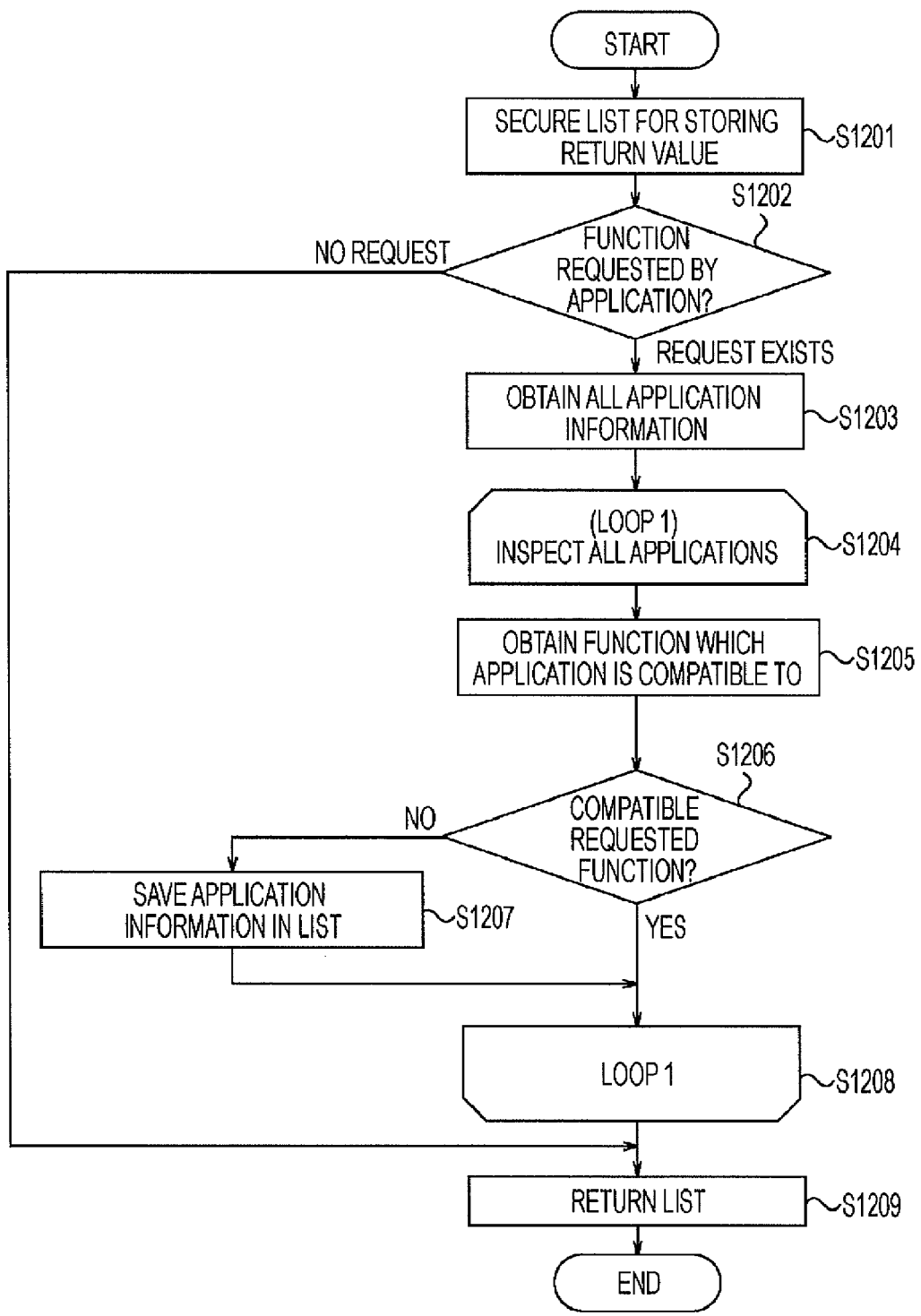
FIG. 12 is a detailed flowchart of Step S1102 according to a first embodiment of the present invention.

FIG. 12 is a flowchart for describing a detail of a process flow in Step S1102 of FIG. 11. In the process of obtaining the list of applications incompatible with the for storing a list of incompatible applications is secured. Next, the process proceeds to Step S1202, and it is judged which type of a function the application whose start has been instructed requests. To be specific, it is judged whether or not there is a declaration in a Require field in the attribute information of the application whose start has been instructed, and if the declaration exists, the content of the declaration is judged. As a result, when a particular function is not requested (NO REQUEST), the process proceeds to Step S1209, where the list secured in and the process is finished.

On the other hand, when some function is requested (REQUEST EXISTS), the process proceeds to Step S1203. In Step S1203, information on all the applications under the control of the application management system is obtained, and the process proceeds to Step S1204. In Step S1204, it is judged whether or not a process of a loop 1 (Steps S1204 to S1208) is performed with respect to all the applications obtained in Step S1203. As a result, when it is judged that the process of the loop 1 is not performed with respect to all the applications, the process proceeds to Step S1205.

In Step S1205, for the respective applications whose information is obtained in Step S1203, a function compatible to the application is obtained. To be specific, it is judged whether or not there is a Compatible field in the attribute information in the respective applications whose information is obtained in Step S1203. When it is judged that there is a Compatible field, information declared herein is obtained. Next, the process proceeds to Step S1206, where it is judged whether or not the application obtained in Step S1202 whose start has been instructed is compatible with the requested function. To be specific, it is judged whether or not the declaration in the Compatible field in the attribute information of the application whose information is obtained in Step S1203 satisfies the declaration in the Require field in the attribute information of the application which has been subjected to the start instruction. As a result, when the application is not compatible to the requested function (NO), the process proceeds to Step S1207. In Step S1207, information on the application judged as incompatible is proceeds to Step S1208. On the other hand, in Step S1206, when it is judged that the application whose start has been instructed is compatible to the requested function (YES), the process directly proceeds to Step S1208.

In Step S1208, the process returns to Step S1204, where it is judged again whether or not the process of the loop 1 is performed with respect to all the applications.

Subsequently, in Step S1204, when it is judged that the process of the loop 1 is performed with respect to all the applications, the process is out of the loop 1, and the process proceeds to Step S1209. In Step S1209, the list finished.

Figure 13:
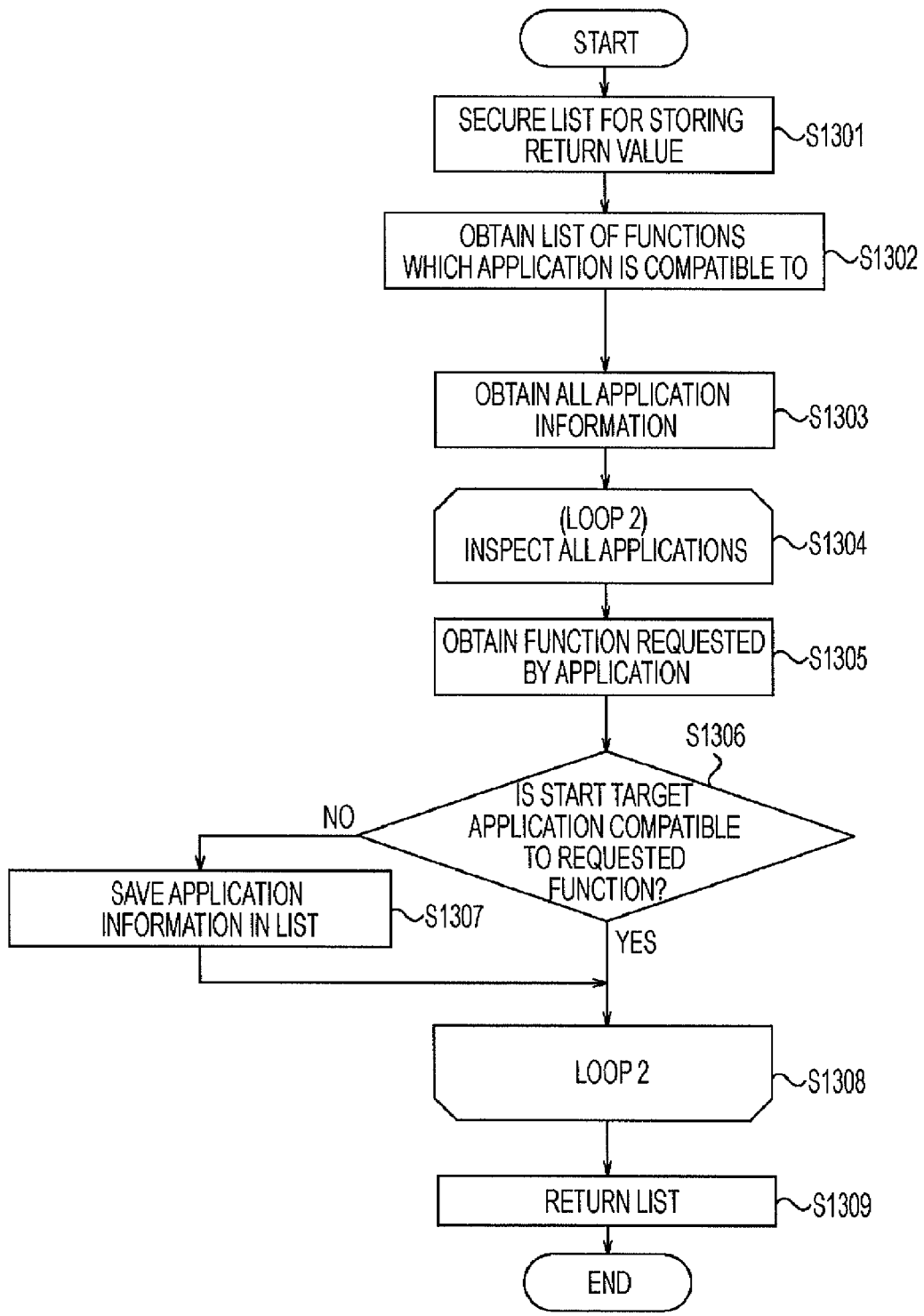
FIG. 13 is a detailed flowchart of Step S1106 according to the first embodiment of the present invention.

FIG. 13 is a flowchart for describing a detail of a process flow in Step S1106 of FIG. 11. In a process where a list of applications to which the application whose start has been instructed is not compatible is obtained in the control target applications of the application management system. First of all, in Step S1301, a list for storing a return value is secured. Next, the process proceeds to Step S1302, where a list of functions with which the application whose start has been instructed is compatible is obtained. To be specific, when there is an indication of the presence or absence of a declaration in the Compatible field in the attribute information of the application whose start has been instructed or when the declaration exists, information declared herein is obtained. Next, the process proceeds to Step S1303 to obtain information on all the applications under the control of the application management system. Next, the process proceeds to Step S1304, where it is judged whether or not a process of a loop 2 (Steps S1304 to S1308) is performed with respect to all the applications. When it is judged that the process of the loop 2 is not performed with respect to all the applications, the process proceeds to Step S1305.

In Step S1305, from the application that has been obtained in Step S1303, a function which the application requests is obtained. To be specific, it is judged whether or not there is a Require field in the attribute information of the respective applications whose information is obtained in Step S1303. When there is a Require field, information declared herein is obtained. Next, the process proceeds to Step S1306, where the information obtained in Step S1302 and the information obtained in Step S1305 are compared with each other and it is judged whether or not the application whose start has been instructed is compatible with the function requested by the application being executed. To be specific, it is judged whether or not the declaration in the Compatible field in the attribute information of the application which has been subjected to the start instruction satisfies the declaration in the Require field in the attribute information of the respective applications whose information is obtained in Step S1303. As a result, when the declaration is not compatible (NO), the process proceeds to Step S1307. In Step S1307, information on the application is stored in the list secured in Step S1301, and the process proceeds to Step S1308. On the other hand, in Step S1306, when the declaration is compatible (YES), the process directly proceeds to Step S1308.

In Step S1308, the process returns to Step S1304, where it is judged again whether or not the process of the loop 2 is performed with respect to all the applications.

Subsequently, in Step S1304, when it is judged that the process of the loop 2 is performed with respect to all the applications, the process proceeds to Step S1309.

In Step S1309, the list secured in Step S1301 is returned, and the process is finished.

Figure 14:
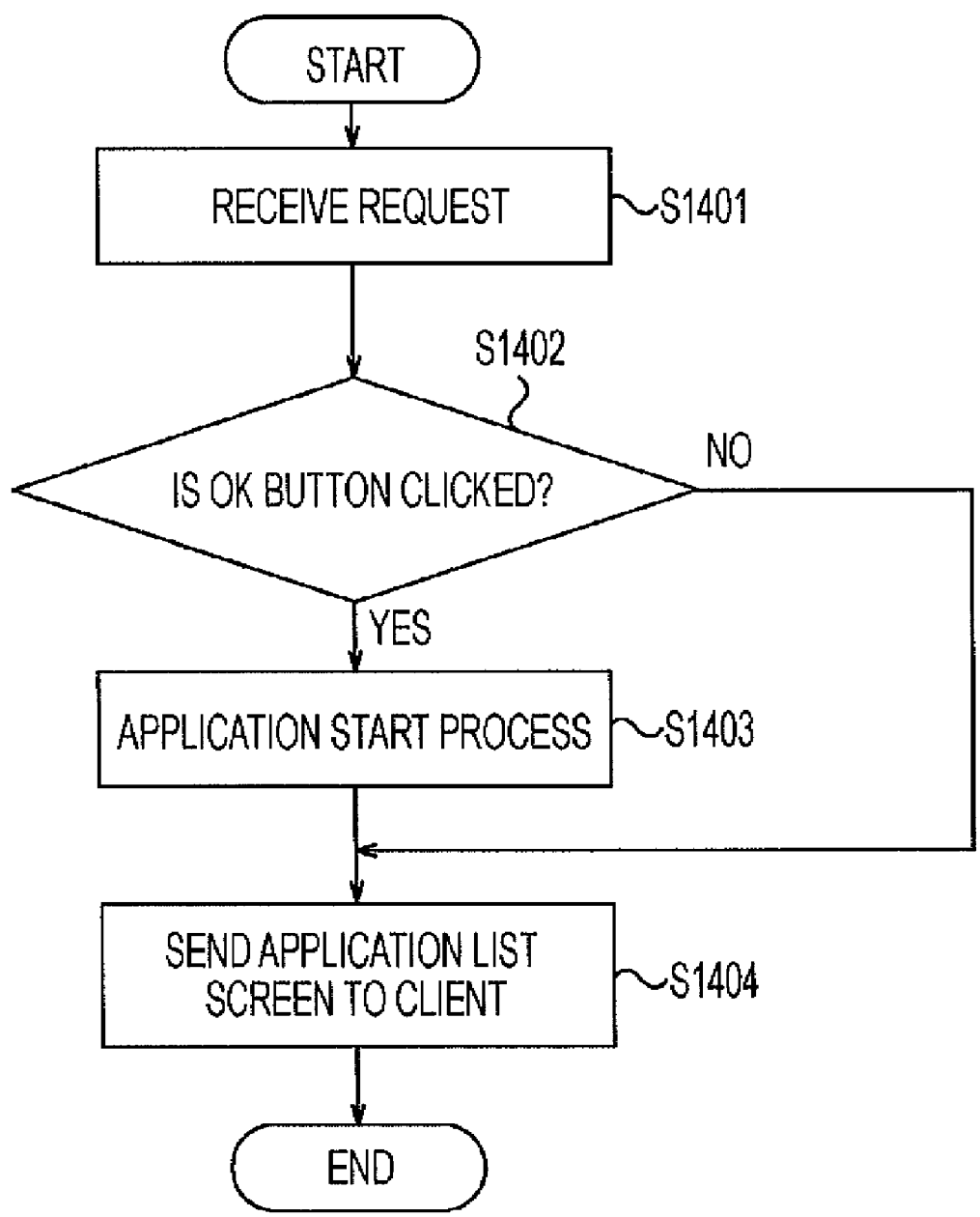
FIG. 14 is a flowchart for describing a process flow of the application management system in the case where an operation is performed on the warning screen at the start of the application.

FIG. 14 is a flowchart for describing a process flow of the application management system when an operation is performed on the warning screen at the time of starting the application. This flowchart is executed by the CPU (not shown in the drawing) which is installed in the core section 12 of the multifunctional machine 100. First of all, when the user performs some operations on the warning screen, in Step S1401, a request is received from a client such as the computer 16. Next, the process proceeds to Step S1402. In Step S1402, it is judged which button is clicked by the user on the basis of the request received in Step S1401. When it is judged that the OK button is clicked (YES), the process proceeds to Step S1403. On the other hand, when it is judged that the cancel button is clicked (NO), the process proceeds to Step S1404.

In Step S1403, the start process of the application specified by the received request is performed, and the process proceeds to Step S1404.

In Step S1404, an application list screen is formed and sent to the client, and the process is finished.

It should be noted that when the OK button 1001 is clicked as an operation on the warning screen shown in FIG. 10, the following construction may be adopted. That is, in Step S1403, the start process is not only performed on the relevant application but a process of forcibly stopping applications ("BOX" and "SIMPLE SEND" in FIG. 10) that are not desired to be concurrently operated with the application may also be performed.

Figure 15:
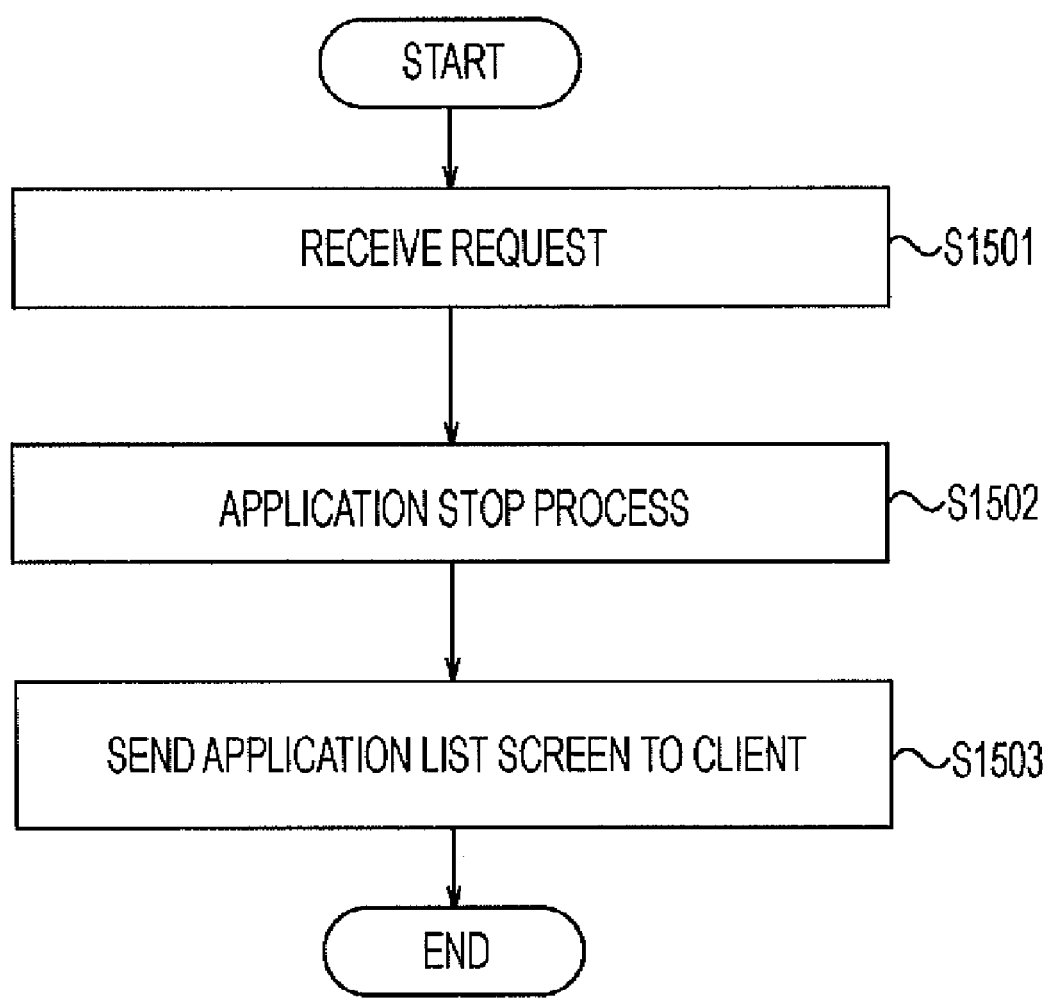
FIG. 15 is a flowchart for describing a process flow of the application management system in the case where an application stop instruction is issued from a client on the authentication list screen.

FIG. 15 is a flowchart for describing a process flow in the application management system when an application stop is instructed from the client on the application list screen. This flowchart is executed by a CPU not shown in the drawing in the core section 12 of the multifunctional machine 100. When the application stop is instructed, first of all, in Step S1501, a request is received from the client. Next, the process proceeds to Step S1502, where the stop process is performed on the application specified by the request received in Step S1501. Next, the process proceeds to Step S1503, where an application list screen is formed and sent to the client, and the process is finished.

It should be noted that, in the above-mentioned embodiment, the continuance of the start process may be selected on the warning screen, but the application start may be restricted while the application that is desired to be restricted is operating. In this case as well, a detail warning message screen prepared by the application whose concurrent operation is desired to be restricted can be displayed, the convenience for the user is improved as compared with the prior art.

Also, in the above-mentioned embodiment, the application itself is made to declare a requested function of other applications, and the declaration is utilized as the information for restricting the concurrent execution. However, the present invention is not limited to the above and it is also possible for example that a database or the like for managing concurrent execution restriction information of the application is prepared and the information is obtained from the database.

According to this embodiment, as has been described above, it is possible to restrict the execution of the plurality of applications that have been installed in the multifunctional machine 100 and that can be executed. In other words, the following situation can be avoided in advance—that the applications that are not desired to be concurrently executed are executed by the user without awareness, or the applications are executed by the user without awareness, causing one application to operate in an unintended manner if concurrently executed with the other application.

Second Embodiment

Similarly to the first embodiment, the image processing system is used as an example of an application management system according to a second embodiment of the present invention, and a description thereof will be given below.

It should be noted that the construction of the image processing system (FIG. 1) and the basic process flow of the application management system (FIG. 11) are the same as those described in the first embodiment. However, according to the second embodiment, a difference resides in that the concurrent execution of applications is restricted on the basis of a type of the device.

Specifically, the attribute information of the history collection application includes device information. Furthermore, there is a difference in details of the process of obtaining the list of applications incompatible with the specified application (Step S1102) and the process of obtaining the list of applications that the application whose start has been instructed in the control target applications of the application management system is incompatible with (Step S1106). For this reason, hereinafter, the different parts will be mainly described in detail.

FIG. 19A shows an example of the attribute information of the history collection application. Herein, a Require field 1901 comprises a declaration made when the concurrent execution of the applications is restricted. A keyword (code) is declared in the Require field, that is, a code is described in the Require field in the attribute information, thereby making it possible to display the warning screen when being concurrently executed with the application incompatible to the keyword. In addition, information related to the device that is a condition of restricting the concurrent execution of the application is described as a parameter.

In the above-mentioned example of FIG. 19A, "LogManagement" indicates the function and "Device=XYZ" indicates the device. In other words, this example means that in the device whose device ID is "XYZ", the concurrent execution of an application incompatible to the LogManagement function is desired to be restricted. Herein, the device ID is ID information assigned to uniquely identify the multifunctional machine, for example.

FIG. 19B shows an example of the attribute information of the copy application. A Compatible declaration 1902 means a declaration of being compatible to a certain function. This case means that the copy application is compatible with the LogManagement function. In other words, as the copy application is compatible with the LogManagement function required by the history collection application, even when the concurrent execution is attempted, the warning screen is not displayed.

FIG. 19C shows an example of an attribute of the simple send application. In this case, the simple send is not compatible to the history collection application, and therefore there is no description in the Compatible field 1902. For this reason, when it is intended that the history collection application and the simple send application are concurrently executed, the warning screen is displayed. It should be noted that as "Device=XYZ" is declared in FIG. 19A, the warning screen is displayed in the device whose device ID is "XYZ" but the warning screen is not displayed in the device whose device ID is not "XYZ".

Figure 17:
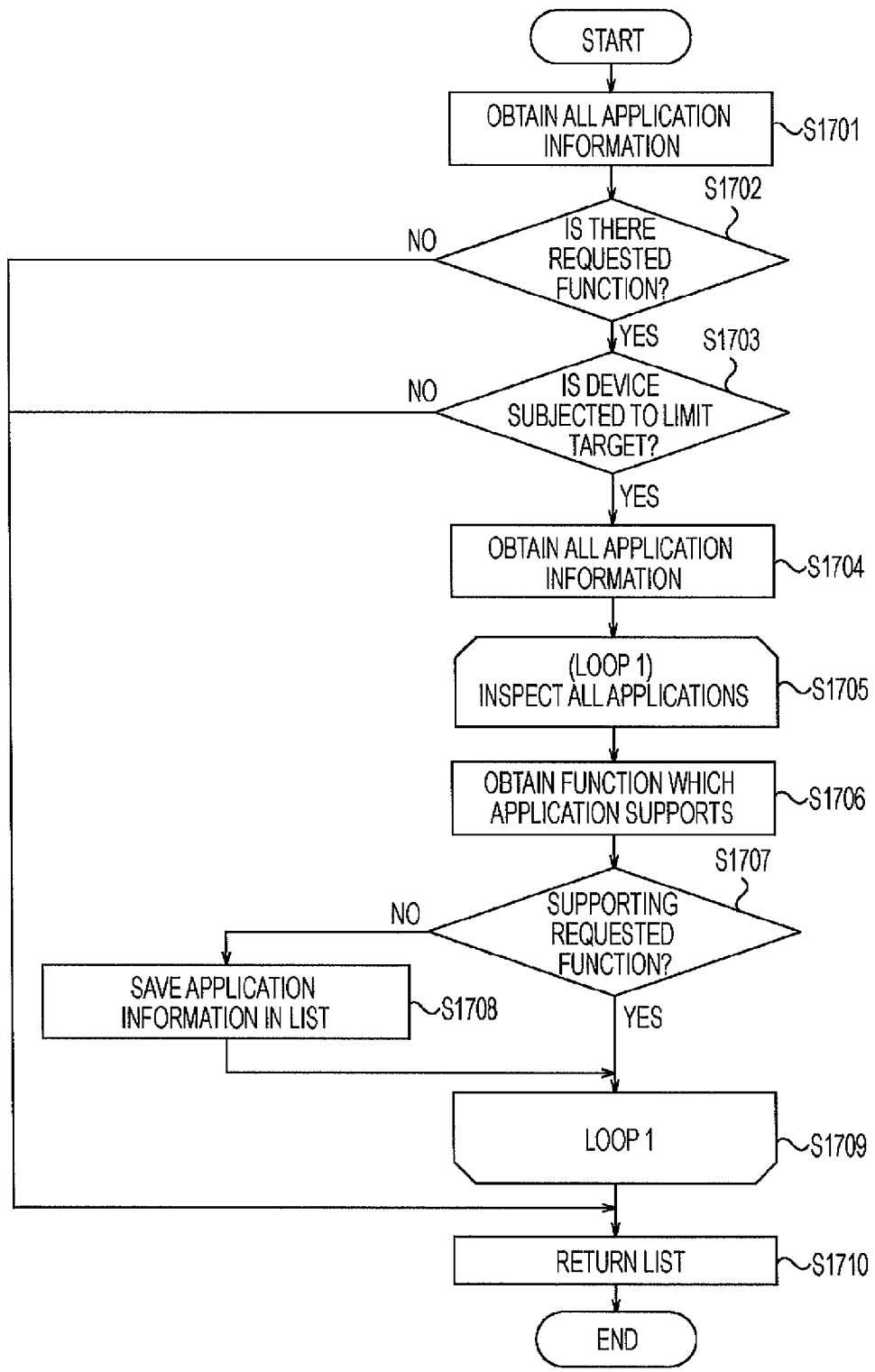
FIG. 17 is a detailed flowchart of Step S1102 according to a second embodiment of the present invention.

FIG. 17 is a flowchart for describing a process flow of obtaining the list of applications incompatible with the specified application (Step S1102 in FIG. 11). This flowchart is executed by the CPU (not shown in the drawing) which is installed in the core section 12 of the multifunctional machine 100.

In this process, first of all, in Step S1701, a list for storing a list of incompatible applications is secured. Next, the process proceeds to Step S1702 to judge which type of function the application whose start has been instructed requests. As a result, when a particular function is not requested (NO REQUEST), the process proceeds to Step S1710, where the list secured in Step S1701 (the empty list in this case) is returned. Then, the process is finished.

On the other hand, when a particular function is requested (REQUEST EXISTS), the process proceeds to Step S1703. In Step S1703, information for identifying the target device that is desired to be subjected to the function restriction is obtained from the application to judge whether or not the device (the multifunctional machine 100 in this case) is the target device. To be specific, it is judged whether or not there is a field of "device=" in the attribute information of the application whose start has been instructed. If the field exists, it is judged whether or not the ID specified by "device=" refers to this device itself. As a result, when it is judged that the multifunctional machine 100 is not the target device, the process proceeds to Step S1710, where the list (the empty list) generated in Step S1701 is returned. Then, the process is finished. On the other hand, in Step S1703, when it is judged that the multifunctional machine 100 is the target device, the process proceeds to Step S1704. In Step S1704, information on all the applications under the control of the application management system is obtained, and the process proceeds to Step S1705. In Step S1705, it is judged whether or not the process of the loop 1 (Steps S1705 to Step S1709) is performed with respect to all the applications obtained in Step S1704. As a result, when it is judged that the process of the loop 1 is not performed with respect to all the applications, the process proceeds to Step S1706.

In Step S1706, by referring to the Compatible field in the attribute information of the application whose information has been obtained in Step S1704, a function which the application is compatible with is obtained. Next, the process proceeds to Step S1707, where the declaration content in the Require field of the application whose start has been instructed and the Compatible field item in the attribute information of the respective applications whose information is obtained in Step S1704 are compared with each other to judge whether or not the field content is compatible to the function requested by the application whose start has been instructed. As a result, when it is judged that the field content is not compatible to the function requested by the application whose start has been instructed (NO), the process proceeds to Step S1708. In Step S1708, the application information judged as incompatible is stored (added) in the list secured in Step S1701, and the process proceeds to Step S1709. On the other hand, in Step S1707, when it is judged that the field content is compatible to the function requested by the application whose start has been instructed (YES), the process directly proceeds to Step S1709.

In Step S1709, the process returns to Step S1705 to judge again whether or not the process of the loop 1 is performed with respect to all the applications.

Subsequently, in Step S1705, when it is judged that the process of the loop 1 is performed with respect to all the applications, the process is out of the loop 1, and the process proceeds to Step S1710. In Step S1710, the list secured in Step S1701 is returned and the process is finished.

Figure 18:
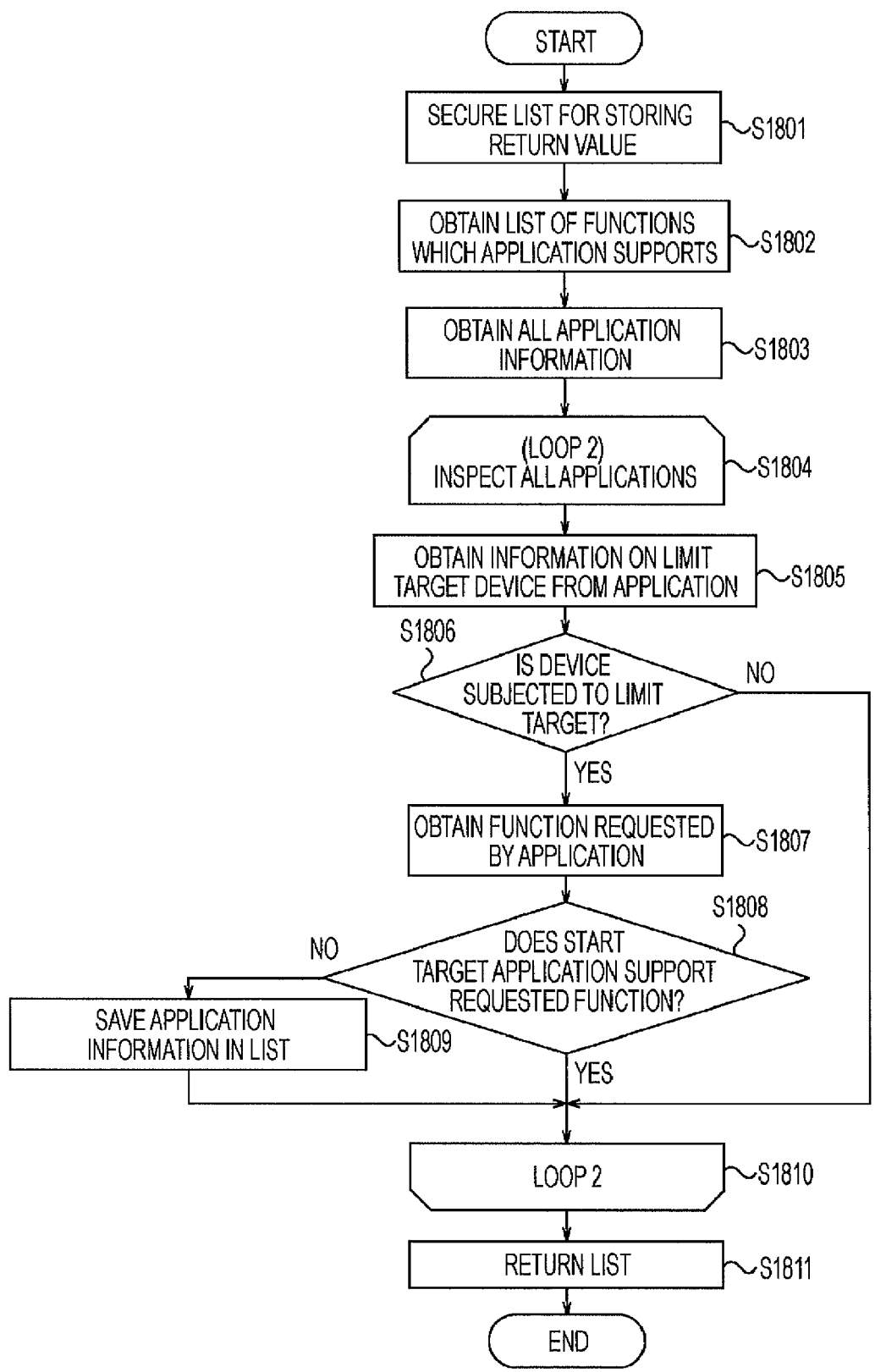
FIG. 18 is a detailed flowchart of Step S1106 according to the second embodiment of the present invention.

FIG. 18 is a flowchart for describing a process flow for obtaining the list of applications that are not compatible by the application whose start has been instructed in the control target applications of the application management system (Step S1106 in FIG. 11). In other words, this is a process of obtaining a list of applications where the application whose start has been instructed becomes a target of the concurrent execution restriction.

First of all, in Step S1801, a list for storing a return value is secured. Next, the process proceeds to Step S1802, where a list of functions which the application whose start has been instructed is compatible with is obtained by referring to the Compatible field in the attribute information of the application. Next, the process proceeds to Step S1803, where information on all the applications under the control of the application management system is obtained. Next, the process proceeds to Step S1804 to judge whether or not the process of the loop 2 (Steps S1804 to S1810) is performed with respect to all the applications. When it is judged that the process of the loop 2 is not performed with respect to all the applications, the process proceeds to Step S1805.

In Step S1805, information on the target device that is desired to be subjected to function restriction is obtained from the field "device=" in the attribute information of the application, and the process proceeds to Step S1806. In Step S1806, it is judged whether or not this device (the multifunctional machine 100) is the target device on the basis of the information obtained in Step S1305. As a result, when it is judged that this device is not the target device, the process proceeds to Step S1810. On the other hand, in Step S1806, when it is judged that this device is the target device, the process proceeds to Step S1807.

In Step S1807, a function requested by the application is obtained from the Require field in the attribute information of the respective applications whose information is obtained in Step S1803. Next, the process proceeds to Step S1808, where the information obtained in Step S1802 and the information obtained in Step S1807 are compared with each other to judge whether or not the application whose start has been instructed is compatible with the function requested by the application being executed. As a result, when it is judged that the application is not compatible with the function (NO), the process proceeds to Step S1809. In Step S1809, the application information is stored in the list secured in Step S1801, and the process proceeds to Step S1810. On the other hand, in Step S1808, when it is judged that the application is compatible with the function (YES), the process directly proceeds to Step S1810. It should be noted that when the requested function cannot be obtained in Step S1807, the process directly proceeds to Step S1810.

In Step S1810, the process returns to Step S1804 to judge again whether or not the process of the loop 2 is performed with respect to all the applications.

Subsequently, in Step S1804, when it is judged that the process of the loop 2 is performed with respect to all the applications, the process proceeds to Step S1811.

In Step S1811, the list secured in Step S1801 is returned, and the process is finished.

It should be noted that according to the second embodiment, the description has been given by using the ID information assigned to the respective devices for identifying the devices being subjected to concurrent execution restriction of the applications. However, information for identifying the devices is not limited to the above. For example, information indicating a type of an application program interface (API) to which the device is compatible may be used. Also, in the case where no device condition for restricting the concurrent execution of the applications is described, a configuration of interpreting all the devices as targets may be adopted.

As has been described above, according to this embodiment, it is possible to provide the application management system with which the application concurrent execution can be restricted appropriately in accordance with the ID of the multifunctional machine 100 that operates the application.

Other Embodiments

The present invention may adopt an embodiment as a system, an apparatus, a method, a computer program, or a storage medium (recording medium), for example. Specifically, the present invention may be applied to a system composed of a plurality of devices or a system made of a single device.

In addition, the following case is also within the scope of the present invention where a software program for realizing the above-mentioned function of the embodiments (the program corresponding to the flowchart shown in the drawings according to the embodiments) is supplied directly or remotely to a system or an apparatus and a computer of the system or the apparatus reads out and executes the supplied program code.

Therefore, the program code itself installed in the computer in order to realize the function process of the present invention in the computer also realizes the present invention. In other words, the present invention includes the computer program itself for realizing the function process of the present invention.

In that case, any form may be adopted such as an object code, a program executed by an interpreter, and a script data supplied to the OS as long as the form is provided with the function of the program.

Examples of a recording medium for supplying the program include, for example, Floppy (registered trademark) disk, a hard disk drive, an optical disk (such as CD or DVD), an optomagnetic disk (MO), a magnetic tape, a nonvolatile memory card, and a ROM.

Also, as an example of a method of supplying the program, a browser of the client computer is used to connect to a web site on the Internet and a computer program of the present invention itself or a compressed file provided with an automatic installment function is downloaded from the web site to a recording medium such as a hard disk drive, whereby the program can be supplied. Also, the present invention can be realized when the program code constituting the program of the present invention is divided into a plurality of files, and those files are downloaded from different web sites. In other words, a WWW server for allowing a plurality of users to download the program file for realizing the function process of the present invention in the respective computers is also within the scope of the present invention.

In addition, the program of the present invention is encrypted and stored in a storage medium such as a CD-ROM. The storage medium is distributed to users. Users satisfying a predetermined condition are allowed to download key information for decrypting the encryption from a web site via the Internet. Then, the key information is used to execute the encrypted program to install the program to the computer for realizing the present invention.

Furthermore, other than the case where the above-mentioned function of the embodiments are realized when the computer executes the read program, an OS or the like running on the computer executes a part of or an entity of the actual processes on the basis of instructions of the program, and the above-mentioned function of the embodiments may be realized by the processes.

Moreover, after the program read from the recording medium is written in a memory provided to a function expansion board that is inserted in the computer or a function expansion unit that is connected to the computer, a CPU or the like provided to the function expansion board or the function expansion unit executes a part of or an entity of the actual processes on the basis of instructions of the program, and the above-mentioned function of the embodiments may be realized by the processes.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Applications No. 2005-188316 filed Jun. 28, 2005 and No. 2006-083871 filed Mar. 24, 2006, which are hereby incorporated by reference herein in their entirety.

What is claimed is:

1. An image processing device, comprising:
 a storage unit configured to store a plurality of applications:
 an instruction reception unit configured to receive an instruction of activation of one of the applications;
 an application activation unit configured to activate an application;
 a warning screen output unit configured to output a warning screen about activation of the application;
 a confirmation instruction reception unit configured to receive from a user an instruction for activating the application in a case where the warning screen output unit outputs the warning screen; and
 a determination unit configured to determine whether information indicating a function required by a first application to a second application having already been activated by the application activation unit, which is included in attribute information of the first application of which the instruction of activation is received by the instruction reception unit, is included in attribute information of the second application,
 wherein in a case where the determination unit determines that the information indicating the function is included in the attribute information of the second application, the application activation unit activates the first application, and
 in a case where the determination unit determines that the information indicating the function is not included in the attribute information of the second application, the warning screen output unit outputs the warning screen about the activation of the first application and the application activation unit activates the first application in accordance with the instruction received by the confirmation instruction reception unit, wherein the first application is a history managing application for collecting an operation history of other applications performed by the image processing device, and wherein the second application is an application of which an operation history cannot be collected by the first application.

2. The image processing device according to claim 1, wherein the warning screen output unit outputs a list about the incompatible applications on the warning screen.

3. The image processing device according to claim 1, further comprising:
  a cancel instruction reception unit configured to receive a cancel instruction of activation of the first application when the warning screen output unit outputs the warning screen; and
  a restoration unit configured to, when the cancel instruction reception unit receives the instruction of the activation of the first application, cancel the activation of the first application and restore a status of the image processing device to a status before the first application is activated.

4. An image processing device, comprising:
  a storage unit configured to store a plurality of applications:
  an instruction reception unit configured to receive an instruction of activation of one of the applications;
  an application activation unit configured to activate an application;
  a warning screen output unit configured to output a warning screen about the activation of the application;
  a confirmation instruction reception unit configured to receive from a user an instruction for activating the application in a case where the warning screen output unit outputs the warning screen; and
  a determination unit configured to determine whether information indicating a function required by a second application to a first application of which the instruction of activation is received by the instruction reception unit, which is included in attribute information of the second application having already been activated by the application activation unit, is included in attribute information of the first application,
  wherein in a case where the determination unit determines that the information indicating the function is included in the attribute information of the first application, the application activation unit activates the first application, and
  in a case where the determination unit determines that the information indicating the function is not included in the attribute information of the first application, the warning screen output unit outputs the warning screen about the activation of the first application and the application activation unit activates the first application in accordance with the instruction received by the confirmation instruction reception unit,
  wherein the first application is a history managing application for collecting an operation history of other applications performed by the image processing device, and
  wherein the second application is an application of which an operation history cannot be collected by the first application.

5. A method for controlling an image processing apparatus into which a plurality of applications are installed, comprising:
  an instruction reception step of receiving an instruction of activation of one of the applications;
  an application activation step of activating an application;
  a warning screen output step of outputting a warning screen about activation of the application;
  a confirmation instruction reception step of receiving from a user an instruction for activating the application in a case where the warning screen output step outputs the warning screen; and
  a determination step of determining whether information indicating a function required by a first application to a second application having already been activated by the application activation step, which is included in attribute information of the first application of which the instruction of activation is received in the instruction reception step, is included in attribute information of the second application,
  wherein in a case where the determination step determines that the information indicating the function is included in the attribute information of the second application, the application activation step activates the first application, and
  in a case where the determination step determines that the information indicating the function is not included in the attribute information of the second application, the warning screen output step outputs the warning screen about the activation of the first application and the application activation step activates the first application in accordance with the instruction received by the confirmation instruction reception step,
  wherein the first application is a history managing application for collecting an operation history of other applications performed by the image processing device, and
  wherein the second application is an application of which an operation history cannot be collected by the first application.

6. A method for controlling an image processing apparatus into which a plurality of applications are installed, comprising:
  an instruction reception step of receiving an instruction of activation of one of the applications;
  an application activation step of activating an application;
  a warning screen output step of outputting a warning screen about activation of the application;
  a confirmation instruction reception step of receiving from a user an instruction for activating the application in a case where the warning screen output step outputs the warning screen; and
  a determination step of determining whether information indicating a function required by a second application to a first application of which the instruction of activation is received in the instruction reception step, which is included in attribute information of the second application having already been activated in the application activation step, is included in attribute information of the first application,
  wherein in a case where the determination step determines that the information indicating the function is included in the attribute information of the first application, the application activation step activates the first application, and
  in a case where the determination step determines that the information indicating the function is not included in the attribute information of the first application, the warning screen output step outputs the warning screen about the activation of the first application and the application activation step activates the first application in accordance with the instruction received by the confirmation instruction reception step, wherein the first application is a history managing application for collecting an operation history of other applications performed by the image processing device, and wherein the second application is an application of which an operation history cannot be collected by the first application.

7. A non-transitory computer-readable medium encoded with a computer program for causing an image processing device to activate a plurality of applications installed in an image processing device, comprising:

an instruction reception step of receiving an instruction of activation of one of the applications;

an application activation step of executing an application; and a warning screen output step of outputting a warning screen about activation of the application;

a confirmation instruction reception step of receiving from a user an instruction for activating the application in a case where the warning screen output step outputs the warning screen; and a determination step of determining whether information indicating a function required by a first application to a second application having already been activated by the application activation step, which is included in attribute information of the first application of which the instruction of activation is received in the instruction reception step, is included in attribute information of the second application, wherein in a case where the determination step determines that the information indicating the function is included in the attribute information of the second application, the application activation step activates the first application, and in a case where the determination step determines that the information indicating the function is not included in the attribute information of the second application, the warning screen output step outputs the warning screen about the activation of the first application and the application activation step activates the first application in accordance with the instruction received by the confirmation instruction reception step, wherein the first application is a history managing application for collecting an operation history of other applications performed by the image processing device, and wherein the second application is an application of which an operation history cannot be collected by the first application.

8. A non-transitory computer-readable medium encoded with a computer program for causing an image processing device to activate a plurality of applications installed in an image processing device, comprising:

an instruction reception step of receiving an instruction of activation of one of the applications;

an application activation step of executing an application;

a warning screen output step of outputting a warning screen about activation of the application;

a confirmation instruction reception step of receiving from a user an instruction for activating the application in a case where the warning screen output step outputs the warning screen; and a determination step of determining whether information indicating a function required by a second application to a first application of which the instruction of activation is received in the instruction reception step, which is included in attribute information of the second application having already been activated in the application activation step, is included in attribute information of the first application, wherein in a case where the determination step determines that the information indicating the function is included in the attribute information of the first application, the application activation step activates the first application, and in a case where the determination step determines that the information indicating the function is not included in the attribute information of the first application, the warning screen output step outputs the warning screen about the activation of the first application and the application activation step activates the first application in accordance with the instruction received by the confirmation instruction reception step, wherein the first application is a history managing application for collecting an operation history of other applications performed by the image processing device, and wherein the second application is an application of which an operation history cannot be collected by the first application.

9. The image processing device according to claim 1, wherein the attribute information includes an identifier for uniquely identifying an image processing device to which information indicating a condition of an application allowed to be executed with the first application is applied, and wherein in a case where the image processing device installing the first application is not an image processing device identified by the identifier, the application activation unit activates the first application regardless of the determination result of the determination unit.

* * * * *